United States Patent
Maienschein et al.

[11] Patent Number: 6,026,941
[45] Date of Patent: Feb. 22, 2000

[54] HYDROKINETIC TORQUE CONVERTER

[75] Inventors: Stephan Maienschein; Uwe Wagner; Hartmut Faust; Marc Meisner, all of Bühl, Germany; Steven Olsen, Wooster, Ohio

[73] Assignee: LuK Getriebe-Systeme GmbH, Buhl, Germany

[21] Appl. No.: 09/082,285

[22] Filed: May 20, 1998

[30] Foreign Application Priority Data

Jun. 4, 1997 [DE] Germany .............................. 197 23 398

[51] Int. Cl.[7] ...................................................... F16D 33/00
[52] U.S. Cl. ..................... 192/3.29; 192/54.3; 192/54.52; 74/731.1
[58] Field of Search ................... 192/3.28, 3.29, 192/3.3, 54.3, 54.5, 54.52; 74/731.1, 732.1

[56] References Cited

U.S. PATENT DOCUMENTS

| | | | |
|---|---|---|---|
| 3,966,031 | 6/1976 | Peterson, Jr et al. ..................... | 192/3.3 |
| 4,002,228 | 1/1977 | Borman ..................... | 192/3.3 |
| 4,153,147 | 5/1979 | Chana ................. | 192/54.5 X |
| 4,157,136 | 6/1979 | Salle ................. | 192/54.52 X |
| 4,169,526 | 10/1979 | Malloy ..................... | 192/3.3 |
| 4,478,105 | 10/1984 | Yamamuro et al. ................. | 192/3.3 X |
| 4,577,737 | 3/1986 | Niikura et al. . | |
| 4,580,668 | 4/1986 | Pickard et al. .......................... | 192/3.29 |
| 4,930,608 | 6/1990 | Schenk et al. ....................... | 192/3.3 X |
| 5,295,915 | 3/1994 | Friedmann . | |
| 5,667,448 | 9/1997 | Friedmann . | |
| 5,711,730 | 1/1998 | Friedman et al. . | |

FOREIGN PATENT DOCUMENTS 195 44 644 A 1  6/1996  Germany .

*Primary Examiner*—Richard M. Lorence
*Attorney, Agent, or Firm*—Darby & Darby

[57] ABSTRACT

The rotary housing of a hydrokinetic torque converter, which can be utilized in the power train of a motor vehicle—for example, in conjunction with a continuously variable transmission—contains a torque monitoring device which is installed in such a way that it does not take up any, or any appreciable, additional space, especially in the axial direction of the housing. The torque monitoring device can serve to transmit torque between the lockup clutch and the output element of the torque converter. Additional features reside in the provision, configuration and manner of mounting of an auxiliary mass, and in the provision of a device for centering the piston of the lockup clutch in the housing as well as a device for centering the housing on the output element of a prime mover.

14 Claims, 9 Drawing Sheets

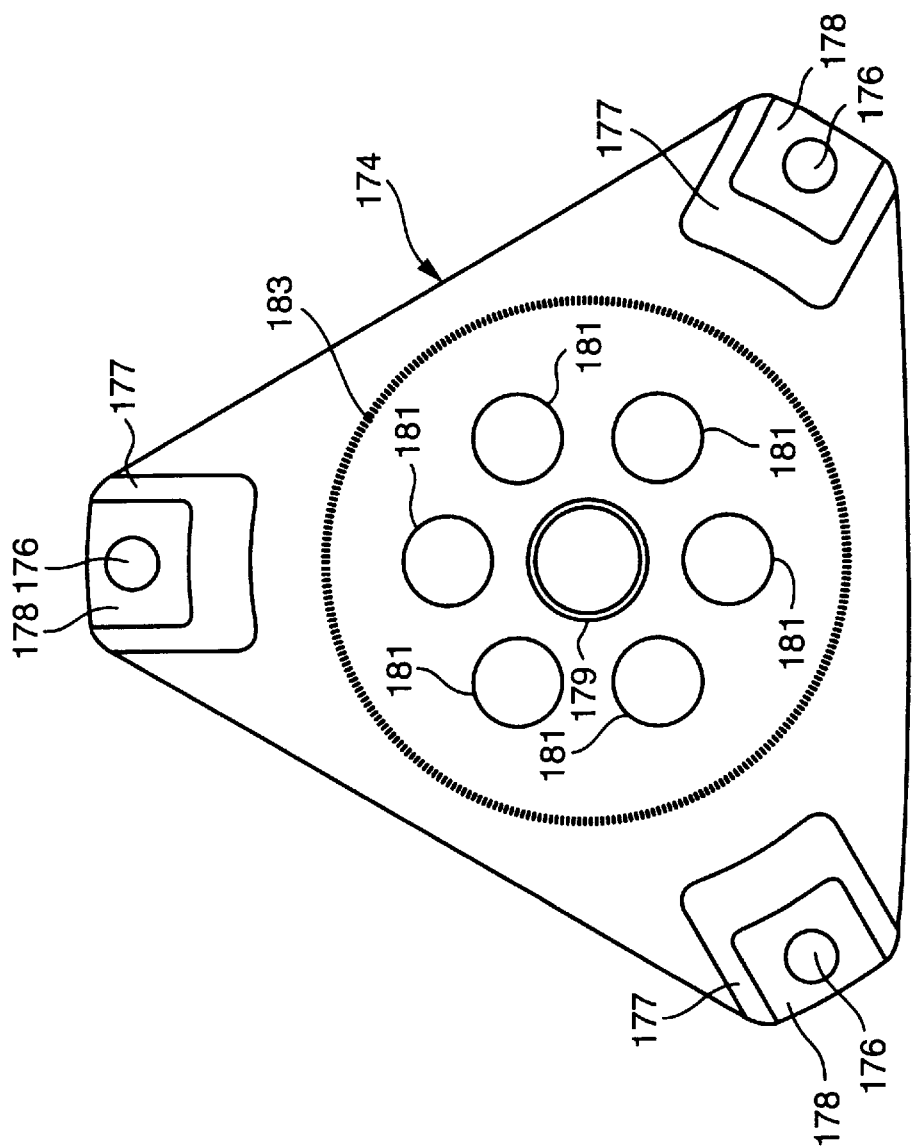
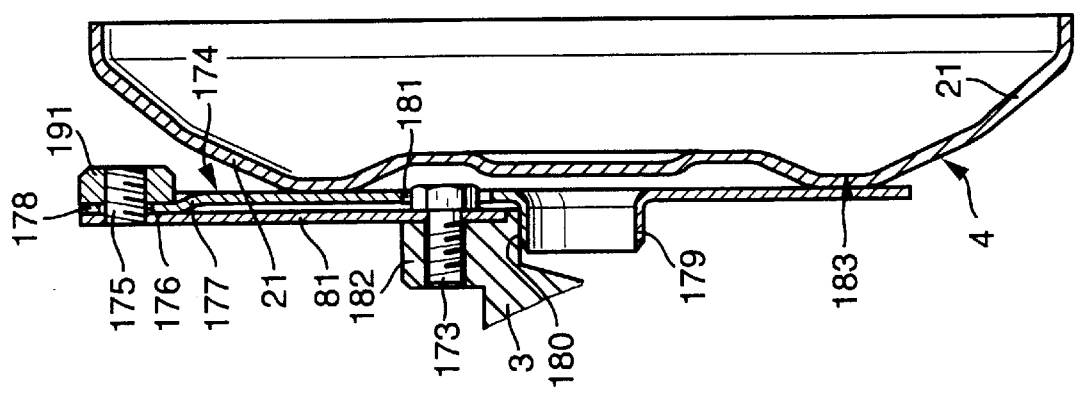

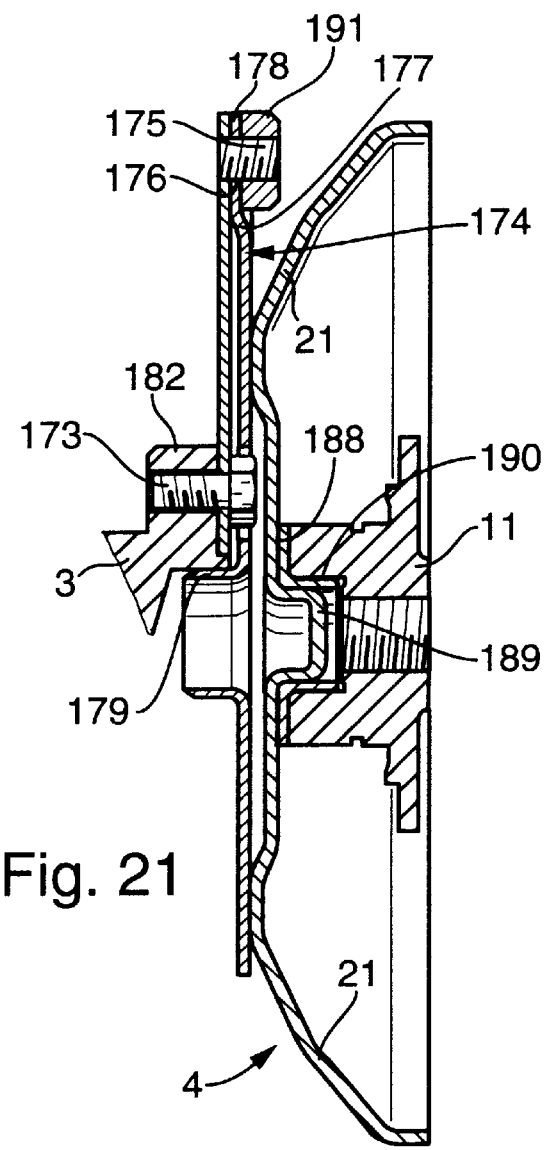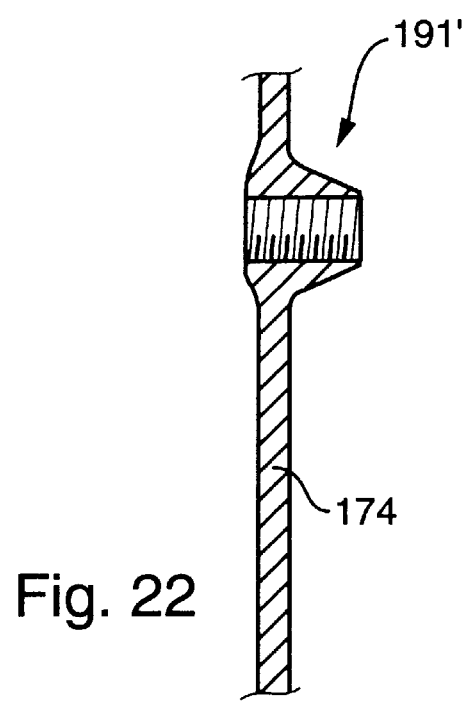
Fig. 21
Fig. 22

HYDROKINETIC TORQUE CONVERTER

BACKGROUND OF THE INVENTION

The invention relates to improvements in torque transmitting systems in general, and more particularly to improvements in so-called hydrodynamic or hydrokinetic torque converters.

A hydrokinetic torque converter which can be modified and improved to embody the present invention is disclosed, for example, in published German patent application No. 44 20 959 A1. A torque converter of the type disclosed in this published German patent application comprises a rotary housing which can be driven by the output element of a prime mover (such as a crankshaft or a camshaft of an internal combustion engine in the power train of a motor vehicle), a pump which is mounted in and is driven by the housing, a turbine which is rotatably mounted in the housing and can transmit torque to a coaxial output element of the torque converter, an optional stator which can be installed in the housing between the pump and the turbine, and a so-called lockup or bypass clutch which can be engaged to transmit torque from the housing directly to the output element.

Torque converters of the above outlined character are frequently combined with a hydraulic or hydromechanical torque sensing or monitoring device (hereinafter called torque sensor or sensor for short) which is normally designed to establish in a hydraulic supply conduit a fluid pressure proportional to the magnitude of transmitted torque. Such sensors are normally or often employed in conjunction with hydrokinetic torque converters which are designed to transmit torque from a prime mover to a continuously variable transmission (CVT). A torque sensor which is employed in conjunction with a hydrokinetic torque converter for controlled transmission of torque to a continuously variable transmission serves to ensure that one or more force transmitting parts are automatically acted upon with a pressure which is a function of the torque to be transmitted by the transmission.

A continuously variable transmission with two adjustable sheaves or pulleys and an endless flexible torque transmitting element (such as a chain or a belt) trained over the pulleys is disclosed, for example, in published German patent application No. 42 34 294 A1. A torque sensor is associated with at least one of the adjustable pulleys in order to ensure that the arcuate portion of the endless flexible element which is trained over the at least one pulley is clamped with a force which is proportional to the magnitude of the torque to be transmitted by the respective pulley. For example, the torque sensor can comprise preferably spherical rolling elements cooperating with surfaces arranged to transmit clamping and/or other forces related to the ratio of and to the torque to be transmitted by the torque converter.

As a rule, a torque sensor is installed next to the housing of a hydrokinetic torque converter, for example, between the torque converter and a continuously variable transmission. Reference may be had, for example, to pages 181–196 of the 1990 edition of German "VDI-Berichte" (meaning: Reports by the Association of German Engineers). A drawback of such mounting of a torque sensor is that, though it is or can be made readily accessible, it contributes significantly to the bulk of the power train, especially as considered in the axial direction of the torque converter.

Reference may also be had to commonly owned U.S. Pat. No. 5,667,448 granted Sep. 16, 1997 to Oswald Friedmann for "POWER TRAIN". The patented power train employs a torque sensor which is installed between two torque transmitting systems in the form of clutches and an adjustable pulley of a continuously variable transmission. That clutch which is at least partially engaged receives torque from the output shaft of a prime mover, e.g., an internal combustion engine in the power train of a motor vehicle. In a motor vehicle wherein the space under the hood is at a premium, the placing of a torque sensor as a discrete part between neighboring constituents of the power train is likely to increase the overall axial length of the power train to an extent which renders the power train unsuitable for use in certain types of motor vehicles.

U.S. Pat. No. 4,577,737 (granted Mar. 25, 1986 to Niikura et al. for LOCK-UP TORQUE CONVERTER AND METHOD FOR CONTROLLING CLUTCH SLIP IN LOCK-UP TORQUE CONVERTER) discloses a hydrokinetic torque converter with a lockup clutch and an electromagnetic torque sensor which is surrounded by the pump as well as by the turbine of the torque converter and is installed radially outwardly of the radially inner portion of the piston of the lockup clutch. Such distribution of the pump, turbine, lockup clutch and torque sensor in the housing of the torque converter contributes significantly to the space requirements of the torque converter, particularly in the radial direction of the housing.

OBJECTS OF THE INVENTION

An object of the invention is to provide a novel power train which can be utilized, for example, in a motor vehicle and embodies an improved combination of a torque converter with a torque sensing or monitoring device (sensor or torque sensor).

Another object of the invention is to provide a simple, compact and reliable combination of a hydrokinetic torque converter and an automatic torque sensor.

A further object of the invention is to provide a hydrokinetic torque converter which embodies a torque sensor.

An additional object of the invention is to provide a novel and improved combination of a hydrokinetic torque converter, which embodies a torque sensor, with a prime mover, such as the internal combustion engine of a motor vehicle.

Still another object of the invention is to provide a hydrokinetic torque converter which embodies a torque sensor and is constructed and assembled in such a way that its space requirements (as considered in the axial direction of its constituents) need not exceed the space requirements of a standard torque converter which does not embody a torque sensor.

A further object of the invention is to provide a novel and improved method of increasing the combined mass of rotary parts of a torque converter which embodies a torque sensor.

Another object of the invention is to provide a novel and improved torque sensor which can be installed with advantage in the housing of a hydrokinetic torque converter but can be utilized also in many other (additional) ways and fields.

An additional object of the invention is to provide a torque sensor which constitutes an improvement over and a further development of devices disclosed in German patent application No. 195 44 644 A1.

Still another object of the invention is to provide a novel and improved twin-chamber torque sensor.

A further object of the invention is to provide a motor vehicle which embodies a hydrokinetic torque converter and a torque sensor of the above outlined character.

Another object of the invention is to provide a torque converter and a torque sensor which can employ a large number of simple and inexpensive parts.

An additional object of the invention is to provide a novel method of integrating a torque sensor into a hydrokinetic torque converter.

Still another object of the invention is to provide a novel and improved method of assembling the contents of the housing of a hydrokinetic torque converter in a manner which exhibits numerous important advantages as concerns the compactness, simplicity, useful life, initial and maintenance cost, and accessibility of the contents.

A further object of the invention is to provide a novel and improved housing for a hydrokinetic torque converter which embodies a so-called lockup or bypass clutch and a torque sensor of the above outlined character.

Another object of the invention is to provide a novel and improved lockup or bypass clutch for use in the above outlined hydrokinetic torque converter.

An additional object of the invention is to provide a novel and improved continuously variable transmission which cooperates with or embodies one or more hydrokinetic torque converters and torque sensors of the above outlined character.

Still another object of the invention is to provide a hydrokinetic torque converter which can be utilized, for example, in the power trains of motor vehicles as a superior substitute for presently known and utilized torque converters.

A further object of the invention is to provide the above outlined hydrokinetic torque converter with novel and improved signal generating means.

Another object of the invention is to provide a novel and improved mode of transmitting torque from the housing directly to the output element of a hydrokinetic torque converter.

SUMMARY OF THE INVENTION

The invention is embodied in a hydrokinetic torque converter which comprises a housing adapted to rotate about a predetermined axis and including a driving section arranged to receive torque from an output component of a suitable prime mover, e.g., from a camshaft or a crankshaft of an internal combustion engine in the power train of a motor vehicle. The housing accommodates a rotary pump, a rotary turbine and an optional stator, and the torque converter further comprises an engageable and disengageable lockup clutch or bypass clutch (hereinafter called lockup clutch) which is provided in the housing and spacedly surrounds the predetermined axis. Still further, the torque converter comprises a torque sensing or monitoring device (hereinafter called sensor or torque sensor) which, in accordance with a feature of the invention, is disposed in the housing between the turbine and the driving section, as seen in the direction of the predetermined axis, and radially inwardly of the lockup clutch.

The aforementioned output component of the prime mover can be said to constitute a rotary input member of the torque converter and is (directly or indirectly) non-rotatably connected with the driving section of the housing.

The torque converter further comprises a rotary output element preferably including a shaft which is arranged to drive a transmission (i.e., which can constitute a rotary input element of the transmission). The output element can further comprise a tubular hub which non-rotatably surrounds the shaft and is arranged to receive torque from the driving section of the housing by way of the turbine or directly by way of the lockup clutch. The transmission is or can constitute a continuously variable transmission (CVT).

The lockup clutch preferably comprises a piston which is mounted on the output element of the torque converter in such a way that it can move relative to the output element (e.g., relative to the aforementioned hub) in the direction of the predetermined axis but cannot rotate relative to the output element. A friction surface of the driving section of the housing is in (direct or indirect) frictional torque transmitting engagement with a friction surface of the piston in the engaged condition of the lockup clutch, and the driving section is rotatable relative to the piston in the disengaged condition of the clutch.

If the rotary output member of the prime mover is not directly connected to the driving section of the housing, the indirect connection between such parts can include a flexible plate-like torque transmitting member which is interposed between and is non-rotatably connected with the output member as well as with the driving section. As already mentioned above, the output member of the prime mover can constitute a camshaft or a crankshaft of an internal combustion engine.

The flexible torque transmitting member may but need not be directly connected with the driving section of the housing of the torque converter. In accordance with a presently preferred embodiment of the invention, the indirect connection between the flexible member and the driving section can include an annular plate-like connector and means for separably securing the connector to the flexible torque transmitting member.

The torque converter can further comprise an auxiliary mass which is affixed to the driving section of the housing and/or to the flexible torque transmitting member and/or to the annular plate-like connector and is located at that side of the driving section which faces away from the clutch, namely toward the output member of the prime mover. For example, the auxiliary mass can be affixed to the flexible torque transmitting member by bolts and nuts, screws and/or other types of threaded fasteners extending through openings provided for the fasteners in the flexible torque transmitting member and/or in the connector. The auxiliary mass can include or constitute a casting.

The connector and the flexible torque transmitting member can be designed and mounted to define an annular space for an auxiliary mass. The latter can be provided with an annulus of signal generating recesses, for example, in that (outer) side of the auxiliary mass which faces away from the axis of the rotary housing. Alternatively, the auxiliary mass can constitute an annulus having a circumferential surface provided with a groove (such as a circumferentially complete groove), and the signal generating means (e.g., for generating signals which can be processed to denote the RPM and/or certain angular positions of the auxiliary mass) then further comprises a shroud (e.g., in the form of a washer or ring) surrounding the circumferential surface of the annular auxiliary mass and provided with signal generating openings in the form of windows in register with the adjacent portions of the groove. The shroud can include or constitute a ring of metallic sheet material, and its windows can form an annular array in that they are spaced apart from each other in a circumferential direction of the aforementioned surface of the auxiliary mass.

The flexible torque transmitting member of the means for connecting the driven section of the housing to the output member of the prime mover can have a substantially circular outline, and the auxiliary mass can be provided with a tubular portion defining a recess for the radially outer marginal portion of the flexible member. In other words, a portion of the auxiliary mass can surround the flexible member.

Alternatively, the flexible torque transmitting member can have a polygonal outline (e.g., that of a triangle, particularly an equilateral triangle), i.e., the flexible member can be provided with several corners which are received in complementary recesses in that side of the auxiliary mass which faces away from the driving section of the housing.

A standard annular starter gear can be provided to surround and to be affixed (e.g., welded) to the periphery of the flexible torque transmitting member, of the connector or of the auxiliary mass. For example, the starter gear can be mounted on the aforementioned tubular portion of the mass, i.e., on that portion which surrounds the periphery of the flexible torque transmitting member.

In lieu of consisting of or including a casting (or in addition to a casting), the auxiliary mass can consist (at least in part) of a suitable metallic sheet material, e.g., a ductile material which can be readily shaped in a number of ways including several presently preferred procedures. For example, the auxiliary mass can include or constitute an annulus and includes a radially inner portion as well as a radially outer portion which is affixed to the driving section of the housing. The radially inner portion of such auxiliary mass can include two layers extending substantially radially of the predetermined axis and overlying each other (as seen in the direction of such axis). The radially outer portion of such auxiliary mass can be of one piece with one of the two overlying layers of the radially inner portion of the auxiliary mass. For example, the radially outer portion of the auxiliary mass and the one layer of the radially inner portion of such auxiliary mass can make an angle which is or at least approximates 90°.

Alternatively, an auxiliary mass which consists (at least in part) of a metallic sheet material can include a radially inner portion adjacent the flexible torque transmitting member, and a radially outer portion including two interfitted tubular layers adjacent the driving section of the housing. One of the two layers is of one piece with and is inclined (e.g., at an angle of at least substantially 90°) relative to the radially inner portion of such auxiliary mass. The one layer is surrounded by the other layer of the radially outer portion of the auxiliary mass. The connector can include a tubular radially outer portion which extends in the direction of the predetermined axis toward the driven section of the housing, and such tubular radially outer portion of the connector can include a first layer surrounding the layers of the radially outer portion of the flexible torque transmitting member as well as a second layer which surrounds the first layer of such radially outer portion of the connector.

Such torque converter can further include externally threaded male fasteners which are affixed to the connector and extend in substantial parallelism with the predetermined axis in a direction away from the driving section of the housing and through openings provided for such male fasteners in the flexible torque transmitting member and in a radially extending substantially washer-like portion of a ring-shaped attachment, preferably an attachment having a radially extending annular portion and an axially extending annular portion making with the radially extending annular portion an angle of at least close to 90°. The radially extending portion of the attachment can be said to constitute a washer which preferably overlies the flexible torque transmitting member. The axially extending annular portion of such attachment can be said to constitute a tube which at least partially surrounds the radially outer portion of the connector. Such torque converter preferably further comprises female fasteners (e.g., nuts) which mate with the male fasteners and are outwardly adjacent the washer-like radially inner portion of the attachment to thus secure the attachment to the connector. Rivets can be utilized to secure the washer-like radially inner portion of the attachment to the flexible torque transmitting member of the means for transmitting torque from the rotary output member of the prime mover to the driving section of the housing of the improved torque converter. The tubular radially outer portion of the attachment can be provided with an annulus of signal generating windows.

In accordance with a further presently preferred embodiment, the auxiliary mass can be of one piece with the driving section of the housing. For example, the auxiliary mass and the driving section of the housing can constitute a one-piece metallic casting. The flexible torque transmitting member can be secured to the auxiliary mass by male fastener means having externally threaded portions (such as the shanks of screws or bolts) extending into tapped bores of the casting including the auxiliary mass and the driving section of the housing.

The auxiliary mass which is of one piece with the driving section of the housing of the torque converter can be provided with a recess at that side which faces away from the turbine, and such recess can receive the radially outermost marginal portion of the flexible torque transmitting member. Such flexible member can have a polygonal outline with several corners, and the aforementioned recess of the auxiliary mass can include portions which snugly receive the corners of such polygonal flexible torque transmitting member. The polygonal outline of such flexible member can be that of an equilateral triangle.

The driving section of the housing, and particularly that driving section which is of one piece with the auxiliary mass, can be of one piece with a centrally located hub coaxial with the housing of the torque converter and (directly or indirectly) connectable with the rotary output member of the prime mover for the torque converter.

The housing of the torque converter further comprises a second section which is welded to or otherwise connected with and hence rotated by the driving section. The second section can be designed to rotate the pump and rotatably surrounds the aforementioned output element of the torque converter. The piston of the lockup clutch is rotatable with the turbine and can include a conical radially outer portion which engages a complementary second conical portion provided on (and preferably but not necessarily forming part of) the driving section of the housing when the lockup clutch is engaged. The conical portions of the piston and of the driving section confront each other, and the lockup clutch preferably further comprises at least one friction lining which is affixed to one of the conical portions and is engaged by the other conical portion in the engaged condition of the lockup clutch. The piston is movable in the direction of the predetermined axis toward and away from the driving section of the housing to respectively engage and disengage the lockup clutch, and the torque sensor can comprise neighboring profiled annular members in the form of discs having confronting ramps. Such torque sensor further comprises one or more spherical or otherwise configurated spreading elements between the two profiled members to move one of the profiled members axially and away from the other profiled member when one of the profiled members is caused to turn relative to the other profiled member. The first profiled member of the torque sensor is arranged to rotate with the output element of the torque converter, and the second profiled member is arranged to rotate with the piston about the predetermined axis and to move relative to the piston in the direction of such axis.

The just described piston of the lockup clutch can comprise a radially inner portion including a tubular flange which extends in the direction of the predetermined axis toward the driving section of the housing. Such torque converter can further comprise a first annular member which is non-rotatably connected with the radially inner portion of the piston and has a tubular radially inner portion provided with internal teeth, a second annular member having external teeth mating with the internal teeth of the first annular member and a radially inner portion which is rotatable relative to the output element of the torque converter about the predetermined axis and is movable relative to the output element in the direction of the predetermined axis, and a third annular member including a radially outer first tubular portion rotatable relative to the tubular flange of the piston about the predetermined axis and movable relative to the flange of the piston in the direction of the predetermined axis. The third annular member further comprises a radially inner second tubular portion which is non-rotatably mounted on the second annular member, and the second profiled annular member of the torque sensor can include a radially outer portion provided with external teeth in mesh with internal teeth provided on a second tubular portion of the third annular member. Such torque converter can further comprise an annular plunger which is non-rotatably provided on a radially inner portion of the second profiled annular member of the torque sensor and includes a tubular first portion extending in the direction of the predetermined axis toward the second section of the housing, a second portion extending from the tubular first portion outwardly toward the lockup clutch, and a tubular third portion which extends from the second portion of the plunger toward the driving section of the housing and sealingly engages the tubular first portion of the third annular member. The third portion of the plunger is rotatable relative to the tubular first portion of the third annular member about the predetermined axis and is movable relative to the tubular first portion of the third annular member in the direction of the predetermined axis.

The second portion of the plunger can extend radially or at least substantially radially of the predetermined axis.

As mentioned above, the output element of the torque converter can comprise a hub and a shaft which is non-rotatably surrounded by the hub. The first profiled annular member of the torque sensor can be non-rotatably secured to the hub, the second profiled annular member of the torque sensor can be mounted on the hub for rotation about the predetermined axis in such a way that it can move relative to the hub in the direction of such axis, and the tubular first portion of the plunger can be mounted in sealing engagement with an annular external collar of the hub so that it is rotatable about the collar (i.e., about the predetermined axis) and is movable relative to the collar in the direction of such axis. The radially inner portion of the second annular member is rotatable on the hub about the predetermined axis and is movable relative to the hub in the direction of such axis. The plunger, the collar, the hub and the second and third annular members jointly define a fluid-containing plenum chamber, and the hub comprises at least one channel in communication with the plenum chamber for admission of a fluid (such as oil) into and for evacuation of fluid from the chamber.

The second profiled annular member of the torque sensor, the plunger, the collar of the hub and another portion of the hub preferably define a second fluid-containing plenum chamber, and the output element of the torque converter then defines at least one second channel which communicates with the second plenum chamber to permit admission of a fluid into the second chamber or to permit the fluid to flow from the second chamber in actual use of the torque sensor.

The third annular member can further include a portion which extends substantially radially of the predetermined axis and includes a tubular part sealingly engaging the hub. The tubular part is rotatable relative to the hub about the predetermined axis and is movable relative to the hub in the direction of such axis.

In accordance with a modification, the first profiled annular member of the torque sensor is non-rotatably secured to the hub of the output element of the torque converter, the second profiled annular member of the torque sensor is rotatable on the hub about the predetermined axis and is movable relative to the hub in the direction of such axis, and the tubular first portion of the plunger is in sealing engagement with the annular external collar of the hub and is rotatable on the collar about the predetermined axis and movable relative to the collar in the direction of such axis. The radially inner portion of the second annular member is rotatable on the hub about the predetermined axis and is movable relative to the hub in the direction of such axis. The second profiled annular member of the torque sensor, the plunger, the collar of the hub and another portion of the hub jointly define a fluid-containing plenum chamber, and the output element of the torque converter defines at least one channel which communicates with the plenum chamber. The piston, at least one of the three annular members, the plunger and/or at least one section of the housing can be obtained by conversion of suitable sheet metal blanks in a deep drawing machine.

That (normally frustoconical) portion of the lockup clutch which is in frictional contact with the piston when the clutch is engaged need not always be of one piece with the driving section of the housing. Thus, such portion of the lockup clutch can constitute a discrete torque transmitting part which is non-rotatably affixed to the inner side of the driving section and is in frictional contact with the piston when the lockup clutch is at least partially engaged.

The driving section of the housing can include a wall which extends at least substantially radially of the predetermined axis, and the discrete torque transmitting part of the lockup clutch can be welded or otherwise affixed to such radial wall of the driving section. Alternatively, the discrete torque transmitting part can be affixed to a tubular wall forming part of the driving section and extending in the direction of the predetermined axis. For example, the discrete torque transmitting part can be laser welded to the radial or tubular wall of the driving section. Alternatively, such part can be riveted to the driving section.

The improved torque converter can further comprise means for centering the piston of the lockup clutch on the output element of the torque converter in the disengaged condition of the clutch. The centering means can comprise a substantially sleeve-like bearing member which is non-rotatably received in a central opening of the piston and surrounds the output element of the torque converter. An internal surface of the bearing member can be provided with a cylindrical portion and a conical portion, and the output element of such torque converter has an external surface including a cylindrical portion surrounded by the cylindrical portion of the internal surface of the bearing member and a conical portion which is complementary to the conical portion of the internal surface of the bearing member and abuts the conical portion of the internal surface in the disengaged condition of the lockup clutch.

The bearing member can be a press fit in the central opening of the piston of the lockup clutch, and a sealing device (such as an O-ring) can be interposed between the bearing member and the output element of the torque converter. For example, the bearing member can be provided with an internal groove for such sealing device. Alternatively, the sealing device can be installed in an external groove of the output element of the torque converter. The construction of the means for centering the piston in the disengaged condition of the lockup clutch can be simplified if the radially inner portion of the piston is provided with a conical internal surface complementary to a conical external surface which is provided on the output element of the torque converter and abuts the conical internal surface of the piston in the disengaged condition of the lockup clutch. The conical external surface of the output element can be provided with a circumferential groove for a sealing device which sealingly engages the conical internal surface of the radially inner portion of the piston in the disengaged condition of the lockup clutch.

The output element of the torque converter can be provided with a discrete centering member having the aforementioned complementary conical external surface, and at least a portion of such discrete centering member can consist of a suitable elastomeric material. Means can be provided to anchor the discrete centering member in the rotary hub of the output element of the torque converter; such anchoring means can comprise an annular groove provided in the hub or in the discrete centering member and a projection provided on the discrete centering member or on the hub and received in the groove.

One of the complementary conical surfaces can be provided with an annular groove for an annular sealing device (such as an O-ring) which establishes a seal between the complementary conical surfaces in the disengaged condition of the lockup clutch.

An additional feature of the invention resides in the provision of novel and improved means for centering the driving section of the housing of the torque converter on the rotary output member of a prime mover. Such centering means can include the aforementioned flexible plate-like torque transmitting member which is connectable with the output member, and an annular plate-like torque transmitting connector serving to transmit torque between the flexible member and the driving section of the housing. The radially outer portions of the flexible member and the connector (namely those portions which are remote from the predetermined axis of the housing) can be non-rotatably affixed to each other by suitable securing means. Such securing means can include threaded fasteners in the form of screws, bolts and nuts or the like.

The connector can be provided with a hub which is coaxial with the housing of the torque converter and is received in a coaxial recess of the output member of the prime mover. Alternatively, the connector can include a centrally located centering section which surrounds a centrally located cylindrical external surface of the rotary output member of the prime mover. As already mentioned above, the output member of the prime mover can constitute a camshaft or a crankshaft of an internal combustion engine in the power train of a motor vehicle.

Still further, accurate centering of the driving section of the housing on the output member of the prime mover can be achieved by providing the driving section of the housing with a centrally located centering projection which is journalled in the rotary output element of the torque converter. Such centering projection may but need not be hollow and can extend in the direction of the predetermined axis toward the turbine in the internal compartment or space of the housing.

The connector can have a polygonal outline (such outline can at least approximate the outline of an equilateral triangle) and includes a plurality of corners which can be offset in the direction of the predetermined axis toward the flexible torque transmitting member of the means for centering the driving section of the housing on the output member of the prime mover. The flexible torque transmitting member is preferably provided with recesses for such corners of the polygonal connector. The connector can include portions which are bonded (e.g., welded) to the flexible torque transmitting member of the centering means.

The novel features which are considered as characteristic of the invention are set forth in particular in the appended claims. The improved hydrokinetic torque converter itself, however, both as to its construction and the mode of assembling and operating the same, together with numerous additional features and advantages thereof, will be best understood upon perusal of the following detailed description of certain presently preferred specific embodiments with reference to the accompanying drawings.

BRIEF DESCRIPTION OF THE DRAWINGS

FIG. 5 is a similar fragmentary axial sectional view of a third modification of the torque converter shown in FIG. 2;

FIG. 6a is a similar fragmentary axial sectional view of a fourth modification of the torque converter shown in FIG. 2;

FIG. 6b is a smaller-scale elevational view of the torque converter embodying the structure of FIG. 6a as seen from the left-hand side of FIG. 6a;

FIG. 7 is a fragmentary axial sectional view of a fifth modification of the torque converter which is shown in FIG. 2;

FIG. 17 is a fragmentary axial sectional view of a hydrokinetic torque converter and of a novel and improved means for centering the housing of the torque converter on the output element of a prime mover, such as the internal combustion engine of a motor vehicle;

FIG. 18 is an elevational view of certain constituents of the centering means for the housing of the torque converter, substantially as seen from the left-hand side of FIG. 17;

FIG. 21 is a fragmentary axial sectional view similar to that of FIG. 17 or 19 but showing a third embodiment of the means for centering the housing of the torque converter on the output element of a prime mover; and FIG. 22 is an enlarged fragmentary axial sectional view of a modified part of a centering means for the housing of the torque converter.

DESCRIPTION OF PREFERRED EMBODIMENTS

Figure 1:
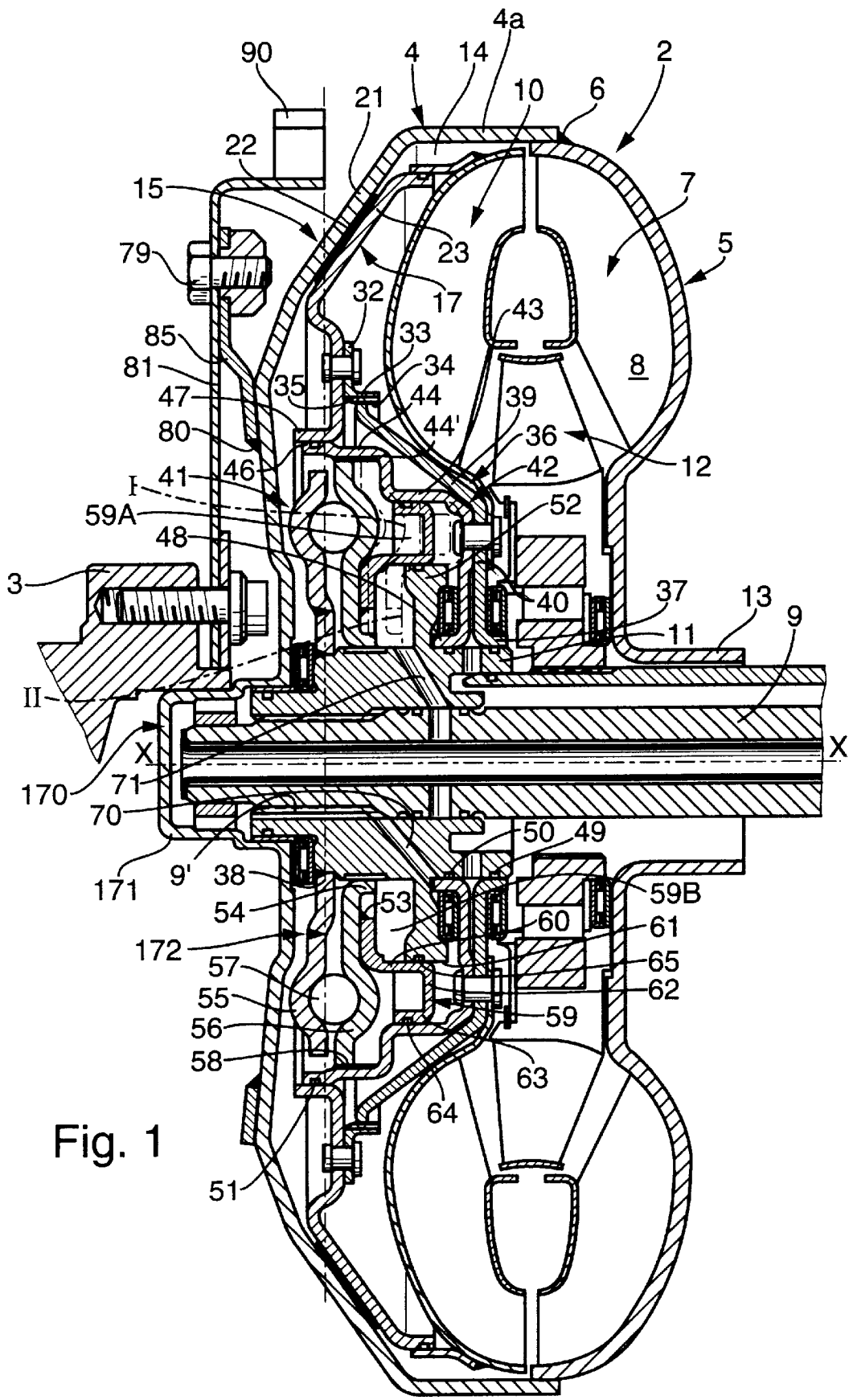
FIG. 1 is a partly schematic axial sectional view of a hydrokinetic torque converter with a lockup clutch and with a built-in torque sensor which embodies one form of the invention.

Referring to FIG. 1, there is shown a hydrokinetic or hydrodynamic torque converter 1 which comprises a composite housing 2 adapted to be rotated about a predetermined axis X-X by the rotary output member 3 of a prime mover (e.g., by the camshaft or crankshaft of an internal combustion engine or an analogous prime mover in the power train of a motor vehicle). The output member 3 of the prime mover is the input element of the torque converter 1.

The housing 2 comprises a cupped driving section 4 which receives torque from the output member 3 of the prime mover, and a second cupped section 5 which is rigidly and sealingly secured to the adjacent cylindrical end portion 4a of the driving section 4 by a circumferentially extending welded seam 6. The open left-hand end portion of the second section 5 is received in the cylindrical open end portion 4a of the driving section 4.

The housing 2 confines a pump 7 having a set of vanes or blades 8 which are or which can be directly affixed to (and can be of one piece with) the second section 5. The housing 2 also confines a turbine 10 which is rotatable with and relative to the pump 7 and is installed between the substantially radially extending left-hand wall of the driving section 4 and the pump (as viewed in the direction of the axis X-X).

An optional stator 12 is normally provided in the housing 2 between the radially inner portions of the pump 7 and the turbine 10, again as viewed in the direction of the common axis X-X of the parts 2, 3, 7, 10 and 12.

The turbine 10 is non-rotatably mounted on a sleeve-like hub 11 of a rotary output element further comprising a shaft 9 which is surrounded by and receives torque from the hub 11. The shaft 9 can constitute an input element of a transmission, such as a continuously variable transmission (CVT) of the type disclosed, for example, in commonly owned U.S. Pat. No. 5,711,730 granted Jan. 27, 1998 to Friedmann et al. for "TORQUE MONITORING APPARATUS". The torque transmitting connection between the hub 11 and the shaft 9 comprises internal teeth provided in the hub 11 and mating with complementary external teeth 9' of the shaft 9.

The second section 5 of the housing 2 has a radially inner portion 13 in the form of a cylinder or sleeve which extends into and is sealingly mounted in the housing or case of a transmission, such as the aforementioned patented CVT of Friedmann et al.

In addition to the pump 7, turbine 10 and stator 12, the internal space or compartment 14 of the housing 2 further accommodates an engageable and disengageable lockup clutch or bypass clutch 15 (hereinafter called lockup clutch) which can be operated to transmit torque directly from the driving section 4 of the housing 2 to the hub 11 of the composite output element including the parts 9, 9' and 11. Still further, the internal space 14 of the housing 2 accommodates a torque monitoring device or torque sensor 41.

That radially outer portion 21 of the driving section 4 which is immediately adjacent to the cylindrical radially outermost portion 4a has a conical (and more specifically a frustoconical) shape and forms part of the lockup clutch 15. The tip of the imaginary cone including the conical portion 21 of the driving section 4 of the housing 2 is located on the axis X-X to the left of the housing 2, as viewed in FIG. 1.

The conical portion 21 can be replaced with a portion extending radially or substantially radially of the axis X-X (i.e., such modified version of the conical portion 21 can be located in a plane which is normal to the axis X-X) in response to an appropriate change of the configuration of the radially outermost portion 23 of an axially reciprocable piston 17 of the lockup clutch 15. The inclination of the conical portion 23 of the illustrated piston 17 matches the inclination of the conical portion 21 of the driving section 4 of the housing 2.

The lockup clutch 15 is at least partially engaged when the confronting friction surfaces of the conical portions 21, 23 engage each other with or without slip. The clutch 15 is disengaged when the piston 17 is caused to move axially and away from the portion 21 of the driving section 4.

FIG. 1 further shows a friction lining 22 which can be affixed to the conical portion 23 of the piston 17 or to the conical portion 21 of the driving section 4. It is also possible to operate without a friction lining 22 or to provide a discrete friction lining on each of the conical portions 21, 23.

The piston 17 of the lockup clutch 15 and/or the driving section 4 and/or the second section 5 of the housing 2 can be made of a suitable metallic sheet material in any suitable way, for example, by resorting to a deep drawing technique.

A first annular member 32 (e.g., a sheet metal part shaped in a deep drawing machine) is secured (such as riveted as actually shown in FIG. 1) to a radially inner portion of the piston 17. The radially inner portion 33 of the first annular member 32 is a relatively short cylinder or tube having an annulus of internal teeth 34 which mate with an annulus of complementary external teeth 35 provided on a radially outermost portion of a second annular member 36. The latter has a relatively short cylindrical (tubular) radially inner portion or flange 37 which is axially movably mounted on and surrounds the hub 11 of the composite output element 9, 9', 11 of the torque converter 1. The second annular member 36 can also be made of a metallic sheet material, particularly in a deep drawing machine of any known design. In order to ensure an optimal subdivision and an optimal utilization of the space 14 which is surrounded by the housing 2, the second annular member 36 can include a frustoconical portion 39 extending from the external teeth 35 in a direction to the right, as viewed in FIG. 1 (i.e., toward the radially inner portion of the housing section 5). The frustoconical portion 39, in turn, merges into a washer-like radially inner portion 40 which carries the aforementioned flange 37 surrounding the hub 11. The annular space between the radially inner portion of the driving section 4 and the second annular member 36 accommodates the torque sensor 41.

A third annular member 42 (this member can also constitute a converted (deep drawn) blank of metallic sheet material) is installed in the housing 2 at that side of the second annular member 36 which confronts the driving section 4. The connection between the annular members 36, 42 can comprise a set of rivets (as actually shown in FIG. 1) or any other suitable fasteners. The third annular member 42 comprises a first tubular (cylindrical) portion 43 extending in the direction of the axis X-X and located radially inwardly of a larger-diameter second tubular (cylindrical) portion 44 having an annulus of internal teeth 44'. The second portion 44 merges into a larger-diameter third tubular (cylindrical) portion 46 which constitutes a flange surrounded by a cylindrical flange 47 constituting the radially innermost portion of the piston 17. The flange 47 is movable relative to the flange 46 in the direction of the axis X-X.

The radially innermost portion of the third annular member 42 constitutes a relatively short cylindrical sleeve 48 which surrounds and is movable relative to the hub 11 in the direction of the axis X-X. Sealing elements (such as O-rings) 49 and 50 are interposed between the external surface of the hub 11 on the one hand, and the internal surfaces of the flanges 37 and 48 on the other hand. A further sealing element 51 (such as an O-ring) is installed between the flange 46 of the third annular member 42 and the flange 47 of the piston 17.

The torque sensor 41 serves to generate a fluid pressure which is a function of one or more parameters, particularly or at least a function of the magnitude of the torque being transmitted by the lockup clutch 15 when the latter is engaged (at least in part) to transmit torque directly between the output member 3 of the prime mover (i.e., between the driving section 4 of the housing 2) and the output element 9, 9', 11 of the torque converter 1, namely when the transmission of torque does not take place (or does not take place exclusively) by way of the housing 2, pump 7 and turbine 10.

The illustrated torque sensor 41 constitutes a hydromechanical torque transmitting device and comprises two confronting profiled disc-shaped members 55, 56 located in that portion of the internal space or compartment 14 which is disposed radially inwardly of the piston 17 of the lockup clutch 15 and between the central portion of the driving section 4 and the turbine 10 (as seen in the direction of the axis X-X). The confronting surfaces of the profiled disc-shaped members 55, 56 (hereinafter called discs or profiled discs) constitute ramps and are in abutment with one or more rolling elements 57 (such as spheres) of the torque sensor 41. The radially inner portion of the profiled disc 55 is rigidly secured to the hub 11, e.g., by welding (shown at 38). The radially inner portion of the other profiled disc 56 is provided with a short axially extending collar 54 which axially movably surrounds the hub 11. The radially outermost portion of the profiled disc 56 is provided with an annulus of external teeth 58 which mate with the internal teeth 44' of the second tubular portion 44 of the third annular member 42 in such a way that the disc 56 is movable relative to the member 42 in the direction of the axis X-X.

That side of the profiled disc 55 which faces toward the central portion of the second section 5 of the housing 2 is connected with a piston or plunger 59 (hereinafter called plunger to distinguish from the piston 17 of the lockup clutch 15). The connection 53 between the plunger 59 and the profiled disc 56 can constitute a welded joint.

The plunger 59 comprises a cylindrical (tubular) portion 60 which extends axially from the profiled disc 56 toward the housing section 5 so that its inner side (confronting the axis X-X) is slidable along the peripheral surface 61 of a radially outwardly extending collar 52 of the hub 11. A second portion 62 of the plunger 59 extends radially outwardly from the portion 60 and merges into a second cylindrical (tubular) portion 63 having a cylindrical outer side in sliding engagement with the internal surface of the tubular portion 43 of the third annular member 42. The portion 63 of the plunger 59 extends from the radial portion 62 toward the central portion of the driving section 4.

A sealing element (such as an O-ring) 65 is provided between the portion 60 of the plunger 59 and the peripheral surface of the collar 52 of the hub 11, and a further sealing element (e.g., an O-ring) 64 is installed between the portion 43 of the annular member 42 and the portion 63 of the plunger 59.

Each of the profiled discs 55, 56 and the plunger 59 can be made of a sheet metal blank which is converted in a deep drawing machine.

FIG. 1 shows quite clearly that, due to its design and the mounting of its constituents, the entire torque sensor 41 can be readily integrated into the torque converter 1; more specifically, the sensor 41 can be readily installed in that portion of the space 14 which is located radially inwardly of the lockup clutch 15 and axially between the turbine 10 and the driving section 4 of the housing 2. This renders it possible to confine the sensor 41 in the interior of the housing 2 without necessitating any, or any appreciable, increase in the dimensions of the torque converter, either radially of the axis X-X or in the direction of such axis. The parts which can be said to constitute important contributors to the aforedescribed dimensions and construction of the torque sensor 41 are the piston 17 of the lockup clutch and the aforementioned annular members 36 and 42.

The mode of operation of the torque converter 1 is as follows:

It is assumed that the lockup clutch 15 is engaged, i.e., that the friction lining 22 rotates with one of the conical portions 21, 23 and bears against the other of these conical portions so that the clutch 15 can transmit torque from the output member 3 and driving section 4 to the hub 11 of the output element of the torque converter 1, i.e., to the shaft 9 which transmits torque to the transmission (such as a CVT) of the power train in a motor vehicle. More specifically, the torque is being transmitted from the friction surface of the conical portion 21 of the driving section 4, via friction lining 22 and the conical portion 23 of the piston 17 which (by way of the mating teeth 34 and 35) transmits torque to the annular member 36. The latter transmits torque to the annular member 42 as well as to the hub 11. The portion 43 of the annular member 42 rotates the profiled disc 56 of the torque sensor 41 by way of the mating teeth 44' and 58.

If the thus transmitted torque develops an abrupt rise or surge, the profiled disc 56 is caused to turn relative to the profiled disc 55 of the torque sensor 41. As already mentioned above, the confronting surfaces of the discs 55, 56 are provided with suitably configurated ramps (not referenced in FIG. 1) which cause the rolling spreading element(s) 57 to move the disc 56 axially of the housing 2 and away from the disc 55 as soon as the disc 56 is caused to turn relative to the disc 55. The axial movement of the disc 56 toward the center of the second housing section 5 is shared by the plunger 59. The new axial position of (a portion of) the disc 56 is shown by dot-dash lines, as at I, and the new axial position of (a portion of) the plunger 59 is also shown by dot-dash lines, as at II.

The just discussed axial shifting of the disc 56 and plunger 59 entails a reduction of the volume of a first plenum chamber 59A between the plunger 59, annular member 42 and hub 11. Some of the fluid (such as oil) which fills the plenum chamber 59A is caused to escape through a channel 70, which is provided in the hub 11, and for example into a plenum chamber of means for changing the axial position of one flange in one pulley or sheave of a continuously variable transmission (CVT), e.g., a transmission of the type disclosed in the aforementioned '730 patent to Friedmann et al.

When the lockup clutch 15 is disengaged, i.e., when the conical portion 23 of the piston 17 does not receive torque from the conical portion 21 of the driving section 4, the housing 2 rotates the output element 9, 9', 11 of the torque converter 1 by way of the vanes 8 of the pump 7, a fluid stream between the pump 7 and the turbine 10, and the turbine.

It is often preferred to design the torque sensor 41 in such a way that it comprises the plenum chamber 59A as well as a second plenum chamber 59B. The latter is defined by the plunger 59, the collar 52, an additional portion of the hub 11 and the profiled disc 56. This second plenum chamber 59B can receive and discharge fluid by way of at least one channel 71 of the hub 11 of the torque converter 1. Pressurized fluid which is expelled from the second chamber 59B via channel 71 can be admitted into the aforementioned chamber of a means for effecting axial movements of one flange of an adjustable pulley or sheave in a continuously variable transmission.

The means for transmitting torque from the rotary output member 3 of the prime mover to the driving section 4 of the housing 2 comprises an annular plate-like flexible torque transmitting member 81 (known as flexplate) having a radially inner portion non-rotatably connected to the output member 3, and an annular plate-like connector 85. The latter has a radially inner portion which is welded (as at 80) and/or otherwise non-rotatably secured to the driving section 4, and a radially outer portion which is secured to the flexible plate-like member 81 by bolts 79 and/or other threaded fasteners (or in any other suitable way, e.g., by rivets and/or by welding).

A customary starter gear 90 is mounted on and surrounds a radially outermost tubular portion of the flexible member 81.

In accordance with another feature of the invention, the torque converter 1 can be equipped with an annular auxiliary mass (one shown at 93 in FIG. 2) which can be designed to take up space which is available between the outer side of the driving section 4 of the housing 2 and the connector 85 of the means for transmitting torque from the output member 3 of the prime mover to the housing 2. The auxiliary mass 93 is further provided with signal generating means in the form of one or more recesses 94 in the peripheral surface of the auxiliary mass. Such signal generating means can cooperate with a device which monitors the RPM of the prime mover.

The dimensions and the location of the auxiliary mass are preferably such that this mass can contribute to the primary mass of the rotary parts of the torque converter 1 without necessitating any increase in the radial and/or axial dimensions of the torque converter.

Figure 2:
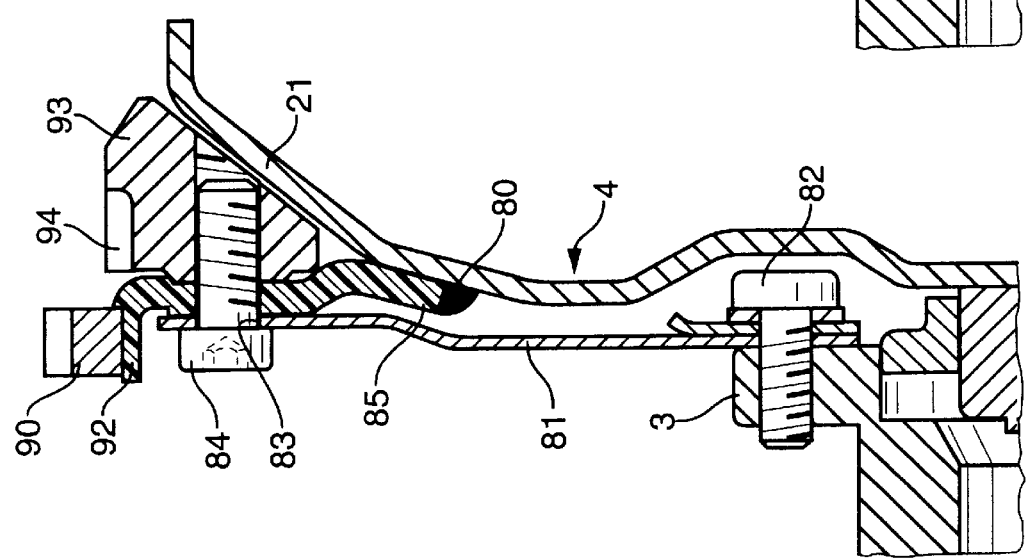
FIG. 2 is a fragmentary axial sectional view of a modified hydrokinetic torque converter with an auxiliary mass secured to the outer side of the driving section of its housing.

The auxiliary mass 93 of FIG. 2 is fitted into the available annular space at the outer side of the conical portion 21 of the driving housing section 4.

The flexible member 81 in the torque converter of FIG. 2 is a washer having a radially inner portion which is affixed to the output member 3 of the prime mover by bolts and nuts 82 and/or other threaded (or other suitable) fasteners. The radially outer portion of the flexible member 81 has openings 83 in the form of bores for portions of threaded fasteners 84 which extend through registering openings of the annular connector 85 and into tapped bores of the auxiliary mass 93. The radially inner portion of the annular connector 85 is secured (e.g., welded, as at 80) to the outer side of the housing section 4, and the radially outermost portion 92 of the connector 85 constitutes a short tube or cylinder which surrounds the adjacent radially outermost portion of the flexible member 81 and is surrounded by and affixed to the starter gear 90.

As can be seen in FIG. 2, the configuration of the auxiliary mass 93 is or can be selected in such a way that it at least substantially fills the available annular space between the outer side of the conical portion 21 of the housing section 4 and the confronting side of the connector 85.

The auxiliary mass 93 of FIG. 2 can constitute a metallic casting. This mass and the starter gear 90 are disposed at opposite sides of the radially extending main portion of the connector 85, i.e., the weight of the mass 93 can be said to balance the weight of the gear 90.

Figure 3:
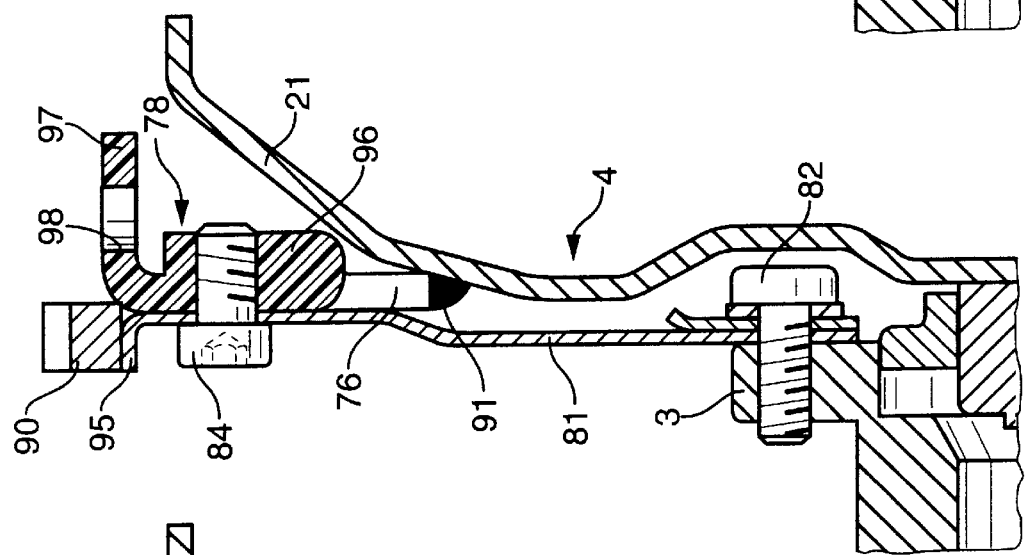
FIG. 3 is a similar fragmentary axial sectional view of a first modification of the hydrokinetic torque converter shown in FIG. 2.

FIG. 3 shows a modified annular auxiliary mass 78 which is a converted blank of metallic sheet material. This auxiliary mass 78 is affixed (e.g., welded, as at 91) to the outer side of the driving section 4 of the housing and is secured to the radially outer portion of the flexible member 81 by screws 84 and/or other suitable fasteners. In other words, the connector 85 of FIG. 2 is or can be omitted. The radially outermost portion 95 of the flexible torque transmitting member 81 constitutes a short cylinder or tube which is surrounded by and affixed to a starter gear 90.

The auxiliary mass 78 of FIG. 3 has a radially extending portion 96 composed of two overlapping disc-shaped layers including an outer layer (adjacent the flexible member 81) which is of one piece with a single tubular (cylindrical) layer 97 extending toward the driving section 4. The layer 97 is provided with one or more signal generating recesses 98 (such as windows or slots extending through the entire layer 97). The outer layer of the radially extending portion 96 of the auxiliary mass 78 has radially inwardly extending preferably arcuate projections 76 (only one shown in FIG. 3) which are welded (at 91) to the adjacent wall of the driving section 4. The projections 76 can constitute non-deformed parts of that portion of a sheet metal blank which is converted into the twin-layer portion 96 of the finished auxiliary mass 78.

The angle between the outer layer of the radially extending portion 96 and the single layer of the tubular portion 97 of the auxiliary mass 78 can equal or approximate 90°.

The connection (by means of threaded fasteners 82) between the radially inner portion of the flexible torque transmitting member 81 and the output member 3 of the prime mover can be the same as that described with reference to FIG. 2.

Figure 4:
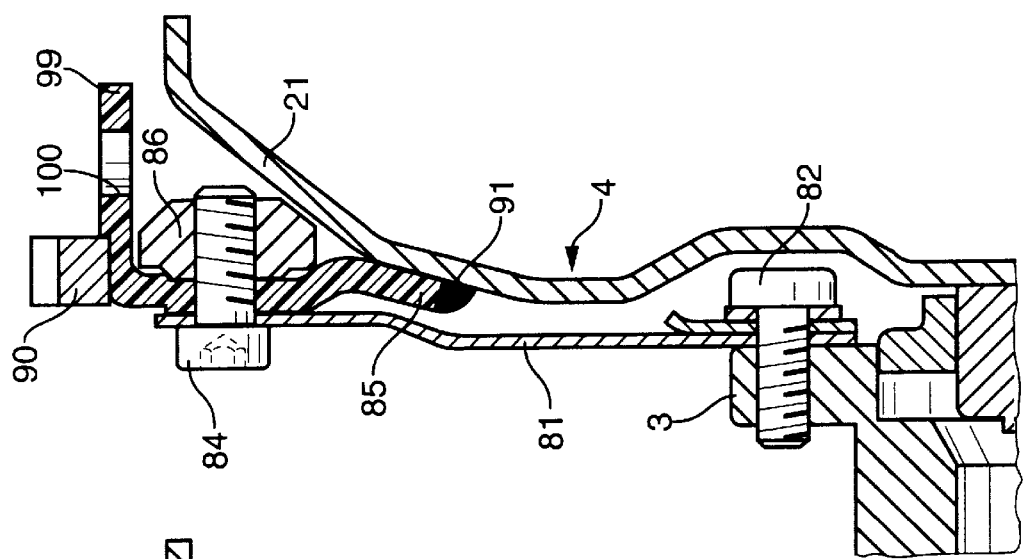
FIG. 4 is a similar fragmentary axial sectional view of a second modification of the hydrokinetic torque converter which is shown in FIG. 2.

FIG. 4 shows a modified auxiliary mass 99 which constitutes a tubular radially outermost portion of the connector 85 and has one or more signal generating openings 100. The starter gear 90 is mounted on the auxiliary mass 99. The radially extending connector 85 is separably connected with the radially outermost portion of the flexible torque transmitting member 81 by bolts 84 and nuts 86, and its radially inner portion is welded (as at 91) to the outer side of the driving section 4 of the housing. A set of discrete nuts 86 can be replaced with a one-piece or composite ring-shaped female fastener which mates with the shanks of the bolts 84 and can be said to constitute an auxiliary mass provided in addition to or in lieu of the connector portion 99. If the portion 99 is omitted, the signal generating openings (corresponding to the openings 100 of FIG. 4) can be provided in the radially outer portion of the common ring-shaped female fastener (auxiliary mass) which replaces the nuts 86.

Figures 5, 6A, 6B, 7:
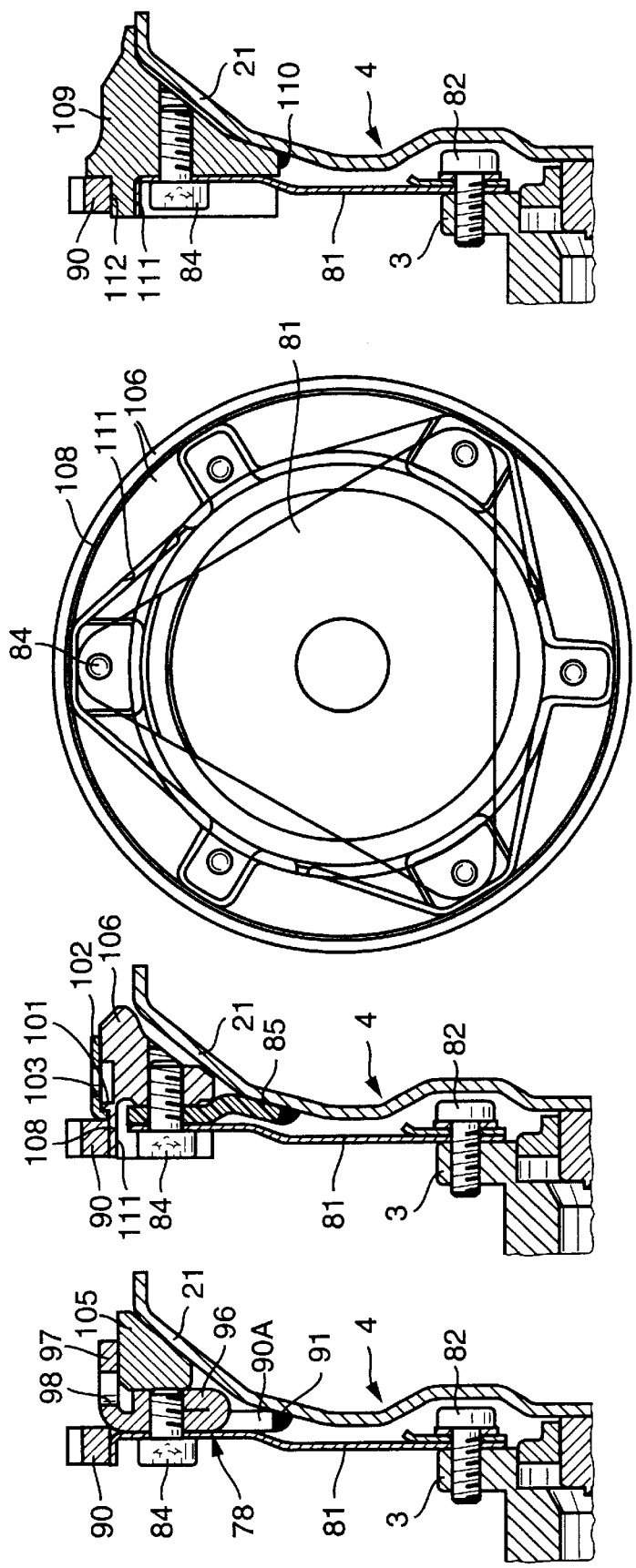

FIG. 5 shows a further modification of a torque converter having an auxiliary mass 105 (e.g., a casting resembling the auxiliary mass 93 of FIG. 2) and a modified connector or second auxiliary mass 78 resembling the similarly referenced part in the torque converter of FIG. 3. In each instance, the single or composite auxiliary mass serves to increase the mass moment of inertia at the primary side of the torque converter. As in the embodiments of FIGS. 2–4, the composite auxiliary mass (78+105) occupies space which is available in the torque converter between the outer side of the driving section 4 and the flexible torque transmitting member 81.

Referring more specifically to FIG. 5, the first or main auxiliary mass 105 is welded to the conical portion 21 of the driving section 4 or is simply form-lockingly held between the two mutually inclined portions of the second auxiliary mass or connector 78 and the conical portion 21. The auxiliary mass 105 is or can constitute a metallic casting, and the connector 78 can be made of sheet metal and includes a radially extending portion 96 with two overlapping layers as well as an axially extending tubular or cylindrical portion 97 of one piece with the left-hand layer of the portion 96. The portion 97 is provided with one or more signal generating openings 98 and the portion 96 is secured to the radially outer portion of the flexible torque transmitting member 81 by threaded fasteners 84. The prongs 90 at the radially innermost part of the radially extending portion 96 may be welded (at 91) and/or otherwise affixed to the driving section 4.

The starter gear 90 is affixed to and surrounds a tubular radially outermost portion of the flexible member 81.

The configuration of the composite auxiliary mass 78+105 of FIG. 5 is preferably such that it at least substantially fills the space between the conical portion 21 of the driving section 4 and the radially outer portion of the flexible member 81.

One of the layers of the radial portion 96 of the mass or connector 78 can be omitted.

FIGS. 6a and 6b show a portion of a torque converter wherein the auxiliary mass 106 constitutes a further modification of the auxiliary mass 93 in the embodiment which is shown in FIG. 2. The auxiliary mass 106 is an annular casting having a peripheral surface facing radially outwardly and away from the axis of the housing including the driving section 4 and provided with a circumferentially complete groove 101. Such peripheral surface of the auxiliary mass 106 is surrounded by a ring-shaped shroud 102 consisting of sheet metal or the like and having one or more openings or windows 103 communicating with the groove 101 and constituting signal generating openings.

The auxiliary mass 106 is affixed to the radially outer portions of the flexible torque transmitting member 81 and the connector 85 by bolts 84 or analogous fasteners having externally threaded shanks extending through registering openings of the members 81, 85 and into tapped bores of the auxiliary mass 106.

The connector 85 is welded to the driving section 4 and can be riveted to the auxiliary mass 106 in addition to or in lieu of the connection which is established by the fasteners 84.

The auxiliary mass 106 has a tubular portion 108 extending in the direction of the axis of the torque converter and away from the housing section 4 to define a recess 111 which receives the radially outermost parts of the members 81 and 85.

As shown in FIG. 6b, the outline of the flexible member 81 can resemble that of an equilateral triangle with three corners snugly received in the adjacent portions of the recess 111 within the extension 108 of the auxiliary mass 106. The central portion of the triangular flexible torque transmitting member 81 is affixed to the output member 3 of the prime mover by threaded fasteners 82.

Again, the configuration and the dimensions of the auxiliary mass are preferably selected in such a way that the auxiliary mass at least substantially fills the space between the conical portion 21 of the driving section 4 and the radially outermost portions of the members 81, 85.

The starter gear 90 is affixed to and surrounds the tubular extension 108 of the auxiliary mass 106. In view of the triangular outlines of the members 81 and 85, the extension 108 can be configured in such a way that it contributes significantly to the bulk and weight of the auxiliary mass 106. It is clear that the members 81 and 85 can assume a polygonal shape other than that of an equilateral triangle without necessitating a pronounced reduction of the mass, bulk and weight of the tubular extension 108.

FIG. 6b shows that the members 81, 85 are connected with the auxiliary mass 106 by three equidistant fasteners 84 each extending through aligned openings in a discrete corner portion of the flexible torque transmitting member 81 and the corresponding corner portion of the connector 85.

Figure 8:
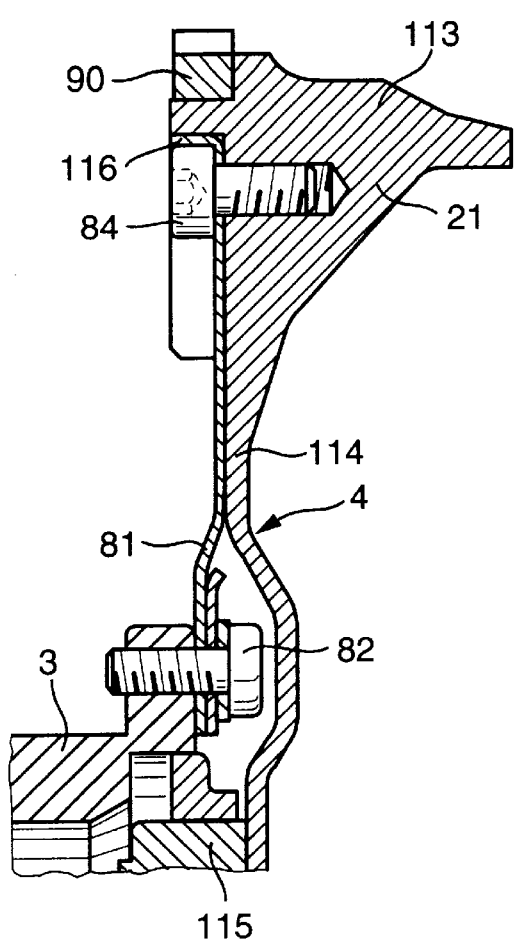
FIG. 8 is a similar fragmentary axial sectional view of a torque converter constituting a sixth modification of the torque converter which is illustrated in FIG. 2.

The flexible torque transmitting members of FIGS. 7 and 8 can also resemble equilateral triangles received in complementary recesses of the respective auxiliary masses 109 and 113. This renders it possible to greatly increase the bulk and weight of the auxiliary masses 109 and 113.

The annular mass 109 in the torque converter of FIG. 7 is a casting which is welded (at 110) to the outer side of the housing section 4 and is separably secured to the radially outermost portion of the flexible torque transmitting member 81 by threaded fasteners 84, e.g., by three fasteners 84 in a distribution similar or identical to that shown in FIG. 6b. The mass 109 fills or practically fills the annular space between the conical portion 21 of the driving section 4 and the radially outer portion of the flexible torque transmitting member 81. Such radially outer portion of the preferably triangular member 81 is received in a recess 111 defined by a tubular extension 112 of the mass 109.

The welded joint 110 between the mass 109 and the driving section 4 is preferably provided slightly radially inwardly of the conical portion 21. Such welded joint can be used jointly with or it can be replaced by other suitable bonding or other connecting means (not shown).

The recess 111 can be a single recess in that side of the mass 109 which faces away from the driving section 4, or a combination of three discrete triangular recesses, one for each of the three corners of a triangular flexible torque transmitting member 81.

The starter gear 90 is affixed to and surrounds the extension 112 of the auxiliary mass 109. As shown in FIG. 7, the extension 112 can be provided with a peripheral groove or cutout for the radially inner portion of the starter gear 90.

FIG. 8 shows a portion of a torque converter wherein the auxiliary mass 113 is of one piece with a radially extending wall 114 of the driving section 4. The parts 4, 113 constitute a metallic casting. The configuration of the mass 113 resembles that of the mass 109 which is shown in FIG. 7. The central portion of the wall 114 is preferably of one piece with a hub 115 which surrounds the spindle 11 or the shaft 9 (not shown in FIG. 8) of the output element of the torque converter.

The means for securing the casting including the auxiliary mass 113 to the radially outermost portion of the flexible torque transmitting member 81 comprises threaded fasteners 84. Additional fasteners 82 are provided to non-rotatably secure the radially inner portion of the flexible member 81 to the output member 3 of the prime mover. The radially outermost portion of the flexible member 81 is received in a recess 116 which is provided in the left-hand end face of the auxiliary mass 113 and is surrounded by the starter gear 90.

The flexible member 81 can have a polygonal shape, e.g., that of an equilateral triangle (as shown in FIG. 6b). The shape of the recess 116 then conforms to the outline of the polygonal flexible member 71. It will be seen that the embodiment of FIG. 8 need not utilize a member corresponding to the aforementioned connector 85.

Figure 9:
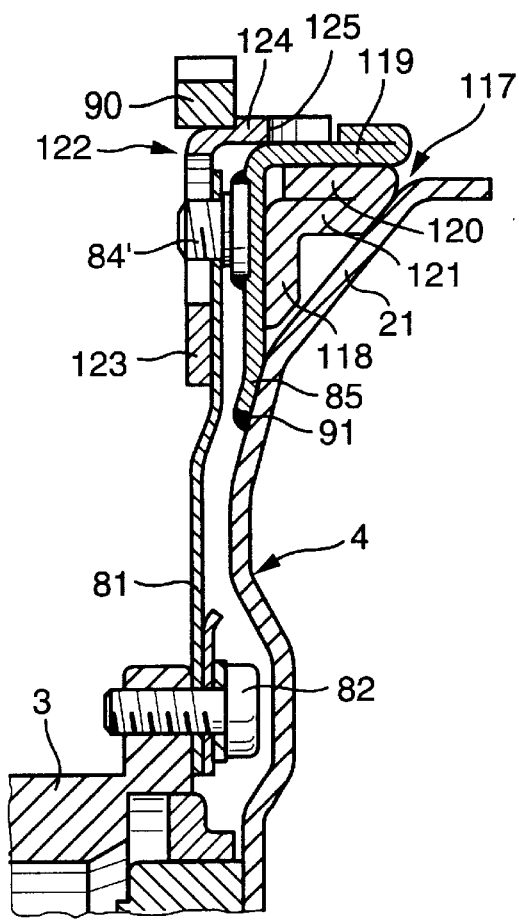
FIG. 9 is a similar fragmentary axial sectional view of a torque converter constituting a seventh modification of the torque converter which is illustrated in FIG. 2.

FIG. 9 shows a portion of a torque converter wherein the auxiliary mass 117 is made of a sheet metal blank and is confined in the annular space between the connector 85 and the conical portion 21 of the driving section 4. The radially inner portion of the connector 85 is welded (at 91) to the outer side of the driving section 4 radially inwardly of the conical portion 21. This connector is made of a suitable metallic sheet material and includes a washer-like radially extending portion adjacent a radially extending portion or layer 118 of the auxiliary mass 117, and a twin-layer tubular portion 119 which overlies the outer layer 120 of the twin-layer tubular radially outer portion of the auxiliary mass 117. The inner layer 121 of the radially outer portion of the mass 117 is of one piece with and makes an angle of preferably 90° with the radially extending layer 118 of the mass 117. The radially outer portion 119 of the connector 85 has two tubular layers the outer of which is shorter than the inner layer, and the latter is surrounded by the axially extending tubular portion 124 of an annular attachment 122 further having a radially extending portion 123 outwardly adjacent the radially outermost portion of the flexible torque transmitting member 81.

The radially extending portion 124 is coaxial with a relatively short outer layer of the axially extending radially outer portion 119 of the connector 125 and is provided with one or more signal generating openings 125. Such opening or openings is or are adjacent a starter gear 90 which is affixed to and surrounds the portion 124 of the attachment 122.

Threaded fasteners 84' have heads welded or soldered to the radially extending portion of the connector 85, and externally threaded shanks extending through registering openings provided in the radially outermost portion of the flexible member 81 as well as through openings in the radially extending portion 123 of the attachment 122. Such shanks mate with nuts (not shown) at the outer side of the portion 123 to establish a fixed connection between the driving section 4, connector 85, flexible member 81 and attachment 122.

The relatively short outer tubular layer of the axially extending radially outermost portion 119 of the connector 85 reinforces the inner tubular layer and can but need not abut the tubular portion 124 of the attachment 122. The tubular radially outer portions 119 and 124 can be said to contribute to the bulk and weight of the auxiliary mass 117.

The fasteners 84' can be omitted if the attachment 122 is riveted or bonded (e.g., welded) to the connector 85.

Figure 10:
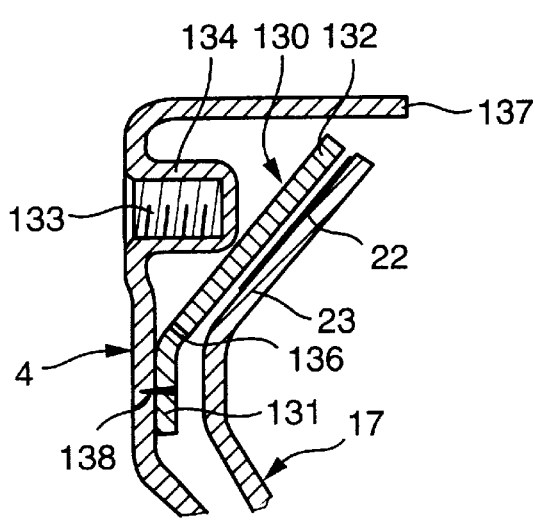
FIG. 10 is a fragmentary axial sectional view of a hydrokinetic torque converter departing from that shown in FIG. 1 in that it employs a different lockup or bypass clutch.
Figure 11:
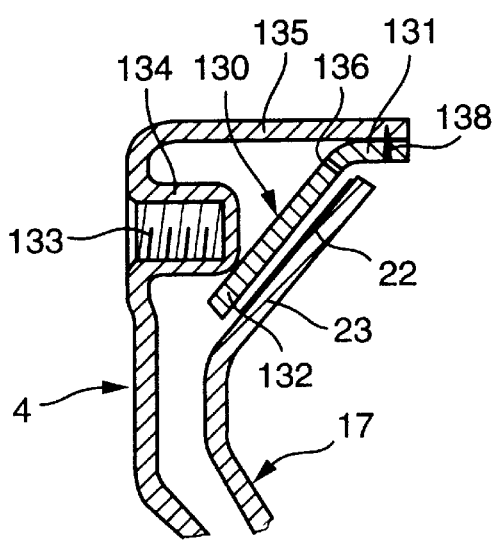
FIG. 11 is a fragmentary axial sectional view similar to that of FIG. 10 but showing a portion of a third lockup clutch.

FIGS. 10 and 11 show that the axially fixed conical section (see the section 21 in FIGS. 1–6a and 7–9) need not always be of one piece with the driving section 4 of the housing of the improved torque converter. In FIG. 10, the conical portion 21 is replaced with a discrete hollow conical torque transmitting part 130 which is laser welded (at 138) to the inner side of the radially extending wall of the driving section 4. The conical part 130 is in frictional engagement with a friction lining 22 (which is assumed to be glued or otherwise secured to the conical portion 23 of the piston 17) when the lockup clutch including the piston 17 and the annular conical part 130 is engaged. The friction lining 22 can be affixed to the discrete conical part 130, or each of the conical portion 23 and conical part 130 can carry a discrete friction lining.

The provision of a discrete conical part 130 (which is ultimately affixed to the housing section 4) contributes to lower cost of the claimed torque transmitting assembly (torque converter) because the driving section 4 of the corresponding housing is simpler than the previously described driving sections. The conical part 130 can be made in a deep drawing machine and can be provided with a continuous or discontinuous radial extension 131 which is of one piece with the conical constituent 132, i.e., with that portion of the part 130 which carries or is engageable with the friction lining. The laser welded joint 138 is provided between the radially extending portion 131 of the conical part 130 and the conical portion 132; such joint can be replaced with another welded joint, with a set of rivets, or with any other suitable connecting or affixing means.

The radially extending wall of the driving section 4 has a set of sockets 134 which are tapped (at 133) to accept the threaded shanks of fasteners (not shown) passing through a flexible member 81 (not shown in FIG. 10 or 11) and, if necessary, through a connector corresponding, for example, to the part 85 shown in FIG. 9. The sockets 134 (only one shown in each of FIGS. 10 and 11) are suitably deformed and aftertreated (tapped) portions of the radially extending wall of the driving section 4.

The discrete part 130 is or can be provided with pressure equalizing ports 136 to permit a fluid (such as oil) to flow between the compartments at the opposite sides of the part 130.

The difference between the conical parts 130 of FIGS. 10 and 11 is that the portion 131 of the conical part 130 shown in FIG. 11 is a short tube which is welded (e.g., laser welded, as at 138) to the tubular radially outermost portion 135 of the driving section 4.

An advantage of the torque converters which embody the structure of FIG. 10 or 11 is that the welded joints 138 are rather remote from the lockup clutch (including the piston 17 and the conical portion 132 of the separately produced part 130) so that a distortion of the conical portion 132 as a result of bonding of the part 130 to the driving section 4 is rather unlikely. Furthermore, the welding (at 137) of the tubular wall 135 of the driving section 4 to the second section (5) of the housing (2) of the torque converter embodying the structure of FIG. 10 or 11 is also less likely to entail a distortion of the constituents (17, 132) of the lockup clutch if the conical part 130 is a separately produced constituent which is laser welded (at 138) to the radially or axially extending portion of the driving section 4 of the housing.

Another advantage of the separately produced parts 130 shown in FIGS. 10 and 11 is that a torque converter originally without a lockup clutch (or a torque converter originally furnished with a lockup clutch having radially extending frictionally engageable torque transmitting parts) can be retrofitted with a lockup clutch of the type shown in FIGS. 10 and 11.

An additional advantage of the structures shown in FIGS. 10 and 11 is that the simplified driving section 4 need not be as stiff (as seen in the circumferential direction of the housing) as a driving section of one piece with a conical portion (21).

Still further, and since the part 130 is a separately produced component, the lockup clutch of a torque converter embodying the structure of FIG. 10 or 11 can be more readily (positively) cooled (such as with oil) because the conical portion 132 of the part 130 is not of one piece with the driving section of the housing. Thus, the ports 136 between the portions 131, 132 of the separately produced part 130 render it possible to cool the respective portion 132 at that side which faces away from the conical portion 23 of the piston 17. The necessary pressure differential at the opposite sides of the portion 132 of the separately produced part 130 is normally available so that the fluid coolant is forced to flow through the ports 136 and to cool that side of the portion 132 which faces away from the portion 23 of the piston 17.

Figure 12:
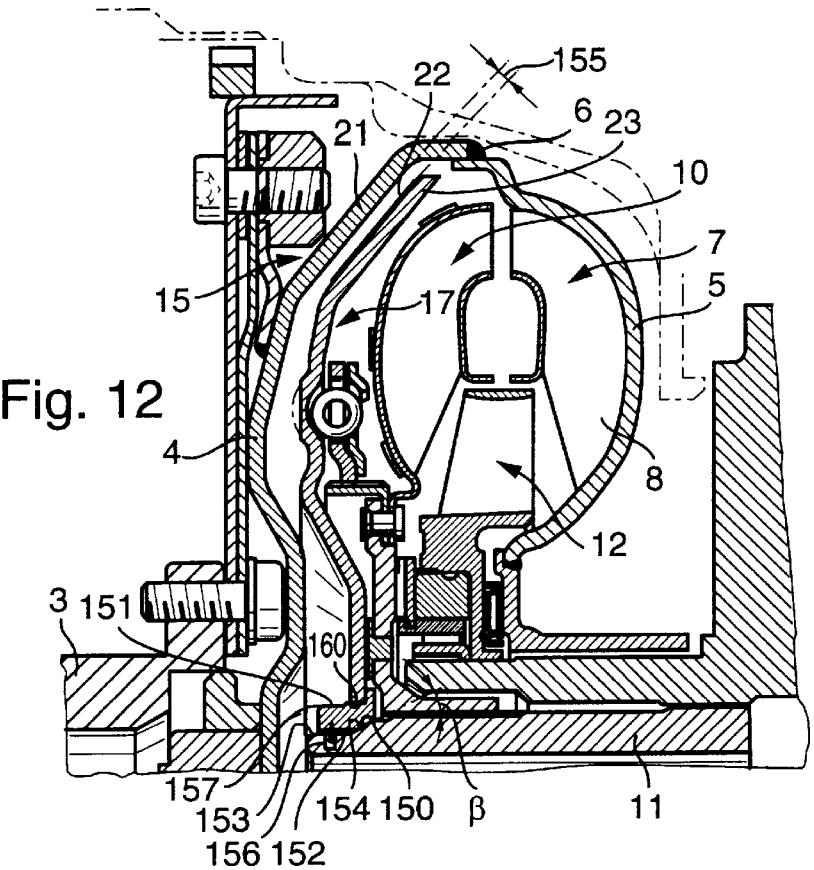
FIG. 12 is a fragmentary axial sectional view of a hydrokinetic torque converter having novel and improved means for centering the piston of the lockup clutch in the disengaged condition of the clutch.

FIG. 12 illustrates one mode of accurately and reproducibly centering the piston 17 of the lockup clutch 15 in the disengaged condition of the clutch, i.e., when the piston is disengaged (and does not receive torque) from the conical portion 21 of the driving section 4 of the housing. The centering is effected by the hub 11 of the output element of the torque converter, and more particularly by cooperating surfaces at the radially innermost portion of the piston 17 and at the exterior of the hub 11.

In accordance with conventional proposals, the axially reciprocable piston of a lockup clutch has a cylindrical internal surface surrounding a cylindrical external surface of the output element of the torque converter. The piston of such conventional lockup clutch can be adequately centered when its conical portion, such as the portion 23 of the piston 17 shown in FIG. 12, (directly or indirectly) engages the complementary conical portion (such as the portion 21 in FIG. 12) of the lockup clutch. However, the aforementioned cylindrical internal and external surfaces cannot ensure an adequate centering of the piston of a conventional lockup clutch when such clutch is disengaged. Inadequate centering of the piston in the disengaged condition of the lockup clutch can cause the piston to wobble and/or to perform other undesirable stray movements which can affect the predictability and accuracy of operation and can shorten the useful life of such conventional lockup clutch.

In accordance with a feature of the present invention, the piston 17 of the lockup clutch 15 is centered at its radially outer part (23) in cooperation with the conical portion 21 of the driving section 4 when the lockup clutch is engaged, and the radially inner part of the piston 17 is centered by the hub 11 when the lockup clutch is disengaged.

FIG. 12 shows that the central opening 160 of the piston 17 receives an annular bearing member 151 which is a press fit so that it cannot turn and/or otherwise move relative to the piston. It is clear that the bearing member 151 can be otherwise fixed (e.g., welded) in the central opening 160 of the piston 17. The bearing member 151 has an internal surface including a cylindrical portion 153 and a conical centering portion 154. The adjacent portion of the hub 11 has an external surface including a cylindrical portion 152 which is surrounded by the cylindrical portion 153, and a conical centering portion 150 complementary to and engaged by the conical portion 154 when the lockup clutch 15 is disengaged. The angle ($\beta$) of slope of the conical surface portions 150, 154 can be a relatively small acute angle. These conical surface portions diverge in a direction toward the second section 5 of the housing of the torque converter which is shown in FIG. 12. The cylindrical surface portions 152, 153 are located between the conical portions 150, 154 on the one hand, and the central portion of the driving section 4 on the other hand.

The reference character 155 denotes a frustoconical clearance between the friction lining 22 (which is shown as being affixed to the conical portion 23 of the piston 17) and the conical portion 21 of the driving section 4 when the lockup clutch 15 is disengaged; at such time, the conical surface portions 150, 154 center the retracted piston 17 on the hub 11.

The cylindrical portion 152 of the external surface of the hub 11 has a circumferentially complete groove 156 for a sealing element 157 (e.g., an O-ring) which sealingly engages the cylindrical portion 153 of the internal surface of the bearing member 151.

Figure 13:
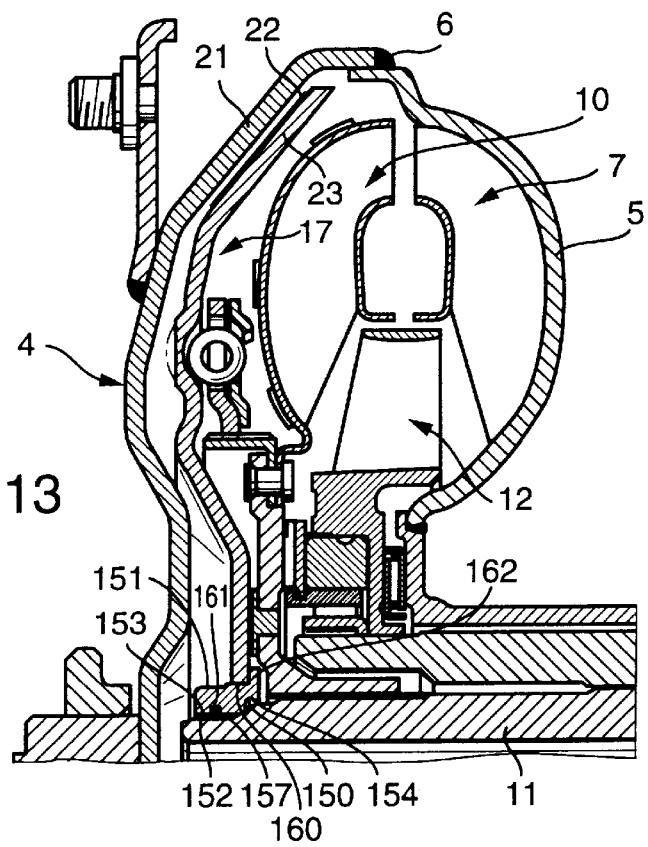
FIG. 13 is a fragmentary axial sectional view similar to that of FIG. 12 but showing modified centering means for the piston of the lockup clutch.

The means for centering the piston 17 in the housing of the torque converter a portion of which is shown in FIG. 13 is analogous to that shown in FIG. 12, and its parts are denoted by identical reference characters. The difference is that the external groove 156 of the hub 11 (FIG. 12) is replaced with a circumferentially complete internal groove 161 in the cylindrical portion 153 of the internal surface of the bearing member 151 and receives a sealing element 157 (e.g., an O-ring) which engages the cylindrical portion 152 of the external surface of the hub 11.

FIG. 13 further shows a radially outwardly extending collar 162 which forms part of the bearing member 151 and abuts the adjacent side of the radially innermost portion (at the central opening 160) of the piston 17. The collar 162 may but need not be positively secured (e.g., welded) to the piston 17.

Figure 14:
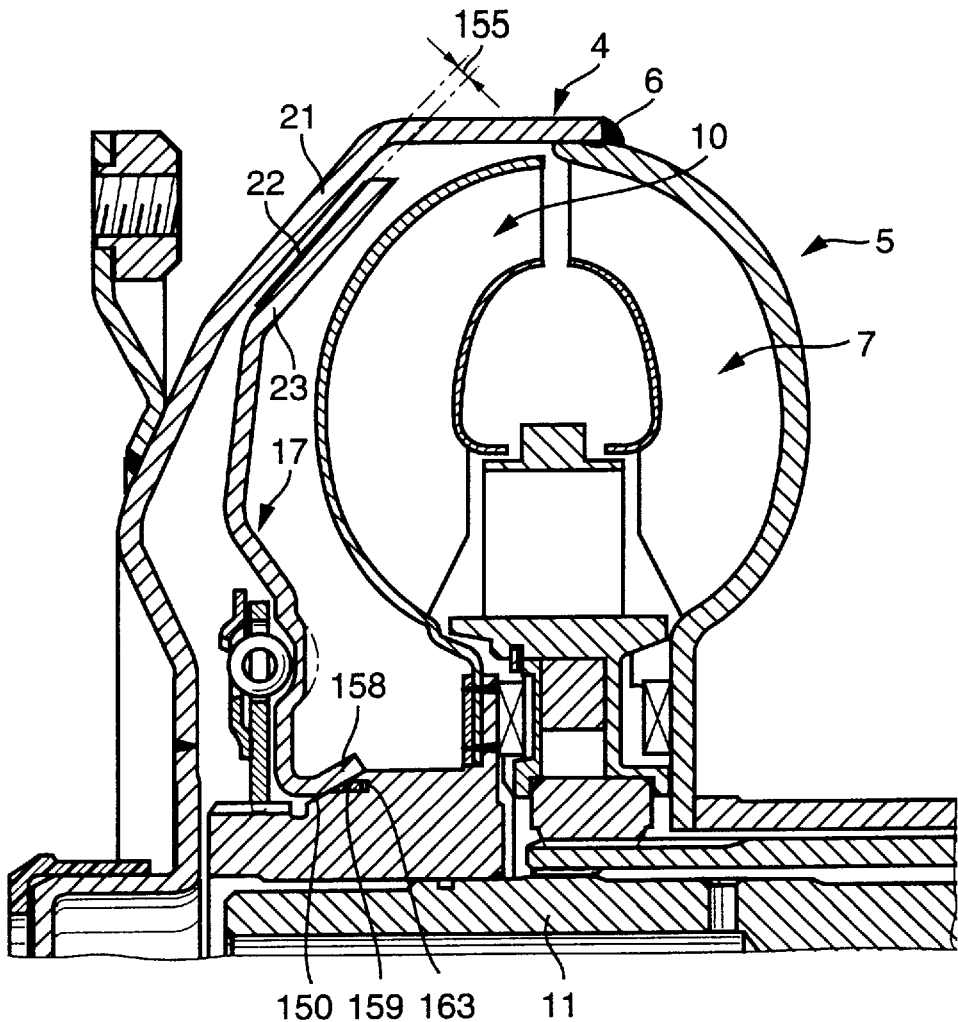
FIG. 14 is a fragmentary axial sectional view similar to that of FIG. 12 or 13 but showing a further centering means for the piston of the lockup clutch in the disengaged condition of such clutch.

FIG. 14 shows a portion of a torque converter wherein the means for centering the piston 17 in the disengaged condition of the lockup clutch (see the clearance 155) comprises a frustoconical radially innermost portion 158 of the piston 17 and a complementary frustoconical centering portion of the hub 11. The conical surface 150 of the centering portion of the hub 11 has a circumferentially complete groove 159 for a suitable sealing element 163 (e.g., an O-ring) which is sealingly engaged by the portion 158 of the piston 17 in the disengaged condition of the lockup clutch.

Figure 15:
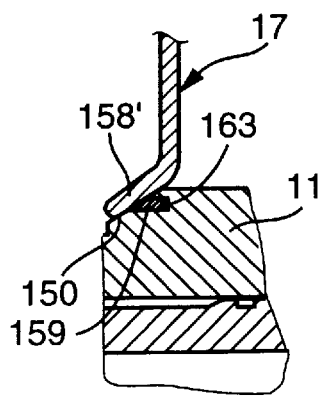
FIG. 15 is a fragmentary axial sectional view of a hydrokinetic torque converter embodying a further centering means for the piston of the lockup clutch.

FIG. 15 shows that the conical portion 158' of the piston 17 can extend radially inwardly and to the left, i.e., toward the central portion of the non-illustrated driving section of the housing in the lockup clutch which embodies the structure of FIG. 15.

Figure 16:
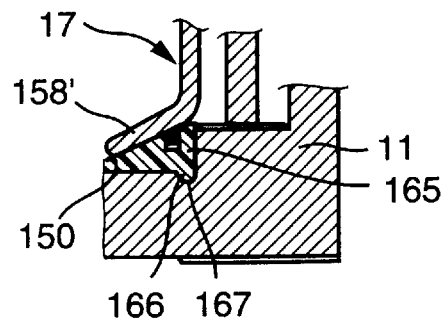
FIG. 16 is a fragmentary axial sectional view similar to that of FIG. 15 but showing certain details of additional centering means for the piston of the lockup clutch.

FIG. 16 shows a ring-shaped discrete centering member 165 which is made of an at least partially resilient (elastomeric) plastic material and is anchored in and surrounds a portion of the hub 11 to cooperate with the conical radially innermost portion 158' of the piston 17. The conical external surface 150 of the discrete centering member 165 has a circumferentially complete groove for a sealing element which is in sealing engagement with the portion 158' in the disengaged condition of the lockup clutch.

The means for anchoring the centering member 165 in the hub 11 includes an internal ring-shaped projection 166 which is received in a peripheral groove 167 machined into or otherwise formed in the adjacent cylindrical portion of the hub 11. The elasticity of the centering member 165 is sufficiently pronounced to enable a person or a machine or a tool to slip the member 165 onto the cylindrical portion of the hub 11 until the projection 166 snaps into the groove 167. It is clear that the projection can be provided on the hub 11 to enter a groove in the internal surface of the centering member 165 and to thus locate the latter in a desired axial position relative to the output element of the torque converter including the structure of FIG. 16. It is also possible to glue the centering member 165 to the hub 11.

FIGS. 17 and 18 illustrate a first embodiment of novel and improved means for centering a torque converter (e.g., a torque converter embodying one or more previously described features of the present invention) on the rotary output member 3 of a prime mover (e.g., on a camshaft or crankshaft of an internal combustion engine in the power train of a motor vehicle). Accurate centering of a torque converter on the rotary output member of a prime mover is necessary or at least highly advisable during initial mounting of the torque converter in the power train.

Heretofore known centering or trueing means for the housing of a torque converter comprise a discrete part which is secured to the housing, e.g., to the driving section 4 of a housing 2 of the type shown in FIG. 1. Such discrete part (shown in FIG. 1, as at 170) can constitute a component made of sheet metal, shaped in a deep drawing machine and provided with a cupped (hollow) centrally located extension 171 which is bonded (e.g., by laser welding) or otherwise affixed to the driving section 4 of the housing 2. A laser welded seam is shown in FIG. 1 at 172. Prior art proposals include several additional centering means all of which must be welded or otherwise bonded to the driving section of the housing of a torque converter.

A drawback of a discrete (separately produced) centering part (such as 170) is that the connection of such part with the housing of a torque converter necessitates at least one secondary treatment subsequent to completion of the welding step (as at 172). Such welding and subsequent secondary treatment involve extensive and expensive work in addition to the initial cost of the centering part (170).

In accordance with a feature of the present invention, and as shown in FIGS. 17 and 18, the separately produced discrete centering part 170 can be omitted by providing a much simpler (and hence less expensive) annular plate-like connector which serves as a means for securing the driving section 4 to and for centering such driving section on the rotary output member 3 of the prime mover. At the very least, the novel proposal to center the driving section 4 on the output member 3 involves the omission of at last one component (or of at least one detail on such component) and/or the elimination of at least one step or a sequence of two or even more steps. For example, the novel design of the means for centering the driving section 4 on the output member 3 renders it possible to eliminate a rather costly deep drawing operation (or to replace a costly deep drawing operation with a much simpler and hence less expensive deep drawing operation) and a costly welding of the thus obtained part to the driving section 4. In addition, the aforementioned simple annular plate-like (flat) connector (which replaces the discrete centering part 170 of FIG. 1) renders it possible to center the driving section 4 relative to an internal and/or external surface of the output member of a prime mover. For example, the connector can be centered on that external surface of the output member 3 which serves to center the normally flexible torque transmitting member 81. In other words, one and the same seat of the output member 3 can serve to center several components including the normally or preferably flexible member 81 and a connector which replaces the rather complex discrete centering part 170 of FIG. 1.

Still another advantage of the just described novel centering method and centering means is that the centering portion of the annular plate-like member can be readily altered so as to conform to the seat of an output member of any one of a plurality of different prime movers (e.g., the camshaft or the crankshaft of the internal combustion engine in the power train of any one of numerous types of motor vehicles). Such versatility of the novel centering means contributes significantly to the ability of the torque converter to serve as a highly satisfactory torque transmitting constituent in any one of numerous types of power trains.

It has been found that threaded fasteners can be utilized with advantage as a means for securing the annular plate-like centering member to the output member of a prime mover and/or to the driving section 4 and/or to the torque transmitting member 81.

Also, in lieu of being affixed to the auxiliary mass or to the member 81, the starter gear 90 can be readily secured to the novel centering member in an operation which can precede a centering of the torque converter housing on the output member of a prime mover (e.g., an internal combustion engine).

The establishment of a reliable connection between the driving section 4 and the novel annular plate-like centering member can involve a rather simple welding and/or riveting operation and/or the utilization of threaded fasteners. The required secondary treatment is negligible, and the necessary operations involving the making and installation of the improved centering member are simple and short-lasting and can be readily carried out by resorting to available machinery. For example, the annular centering member can be connected with the torque transmitting member 81 in a simple and time-saving operation. This constitutes a considerable simplification of the centering operation because the welding of a conventional centering part (170) to the driving section 4 can create numerous problems as concerns adequate sealing of the internal space 14 of the housing 2 from the surrounding atmosphere, the possibility of deformation of the conical portion 21 during the establishment of a welded connection (at 172 in FIG. 1) and/or others. In other words, the utilization of the novel centering technique for the housing 2 is much less likely to exert an adverse influence upon the lockup clutch 15 and/or upon the aforedescribed centering means for the piston 17 in the disengaged condition of the lockup clutch 15.

As shown in FIG. 17, the driving section 4 is a one-piece part which includes the conical portion 21. The preferably or normally flexible torque transmitting member 81 is secured to the rotary output member 3 by bolts 173 or analogous threaded fasteners. An annular plate-like combined centering and connecting member or part 174 (which can have a polygonal outline as shown in FIG. 18) is affixed to the member 81 by bolts 175 or analogous threaded fasteners. The illustrated member 174 has an outline corresponding to that of an equilateral triangle and its corners have holes 176 (e.g., in the form of bores) for the shanks of the fasteners 175. In order to prevent the member 174 from lying flush against the torque transmitting member 81, the corners of the member 174 are provided with recessed portions 177, 178. The recessed portions 178 are deeper and smaller than the corresponding recessed portions 177, and those parts of the member 174 which define the deeper recessed portions 178 abut the member 81. The openings 176 are provided in those parts of the member 174 which define the deeper recessed portions 178.

The member 174 can be formed in a deep drawing machine and includes a relatively short tubular central portion 179 surrounded by a a cylindrical internal centering surface 180 of the output member 3 radially inwardly of the fasteners 173. The central portion 179 is surrounded by holes, openings or windows 181 (e.g., cutouts) of the member 174 which provide room for the introduction of the shanks of the threaded fasteners 173 into tapped bores provided in a ring-shaped end portion 182 forming part of the output member 3 and surrounding the cylindrical centering internal surface 180.

A simple welded seam 183 (e.g., a laser welded seam) can serve as a means for non-rotatably securing the member 174 to the driving section 4 radially inwardly of the conical portion 21.

Figure 20:
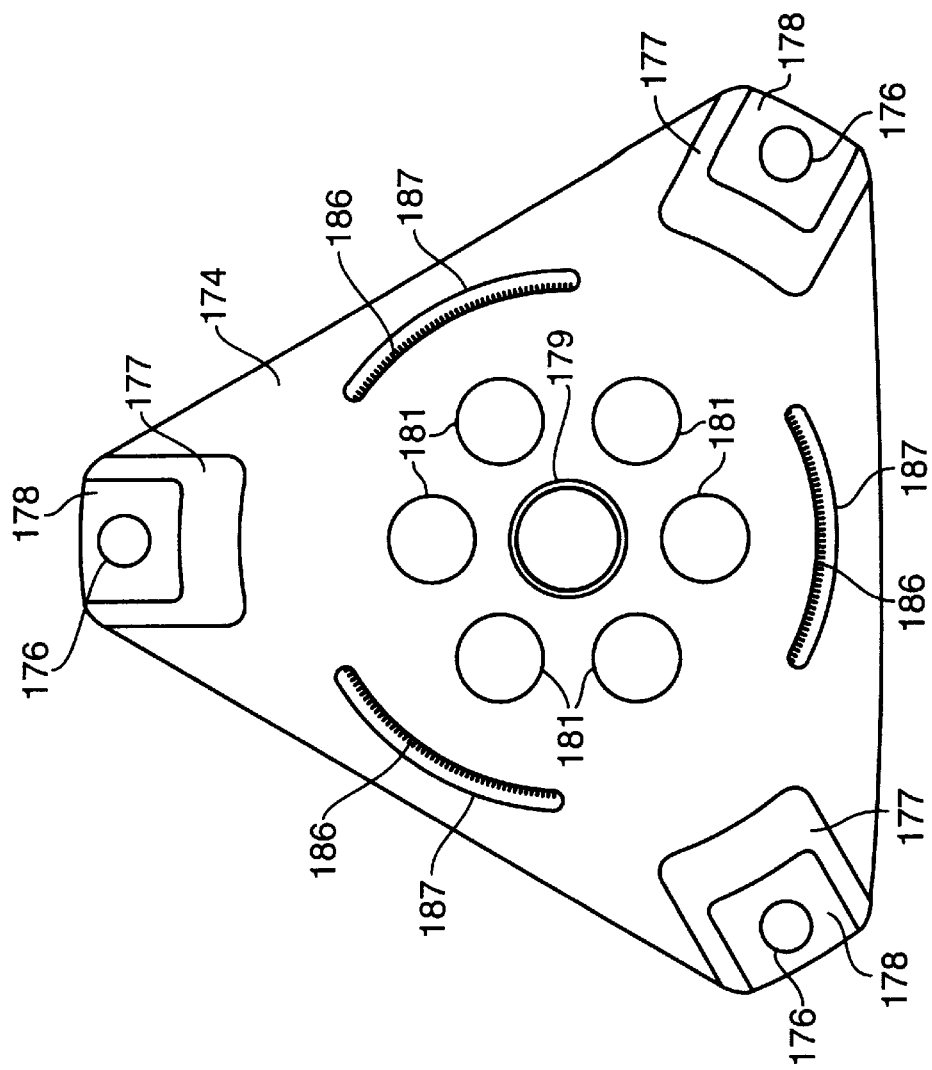
FIG. 20 is an elevational view of certain constituents of the modified centering means substantially as seen from the left-hand side of FIG. 19.
Figure 19:
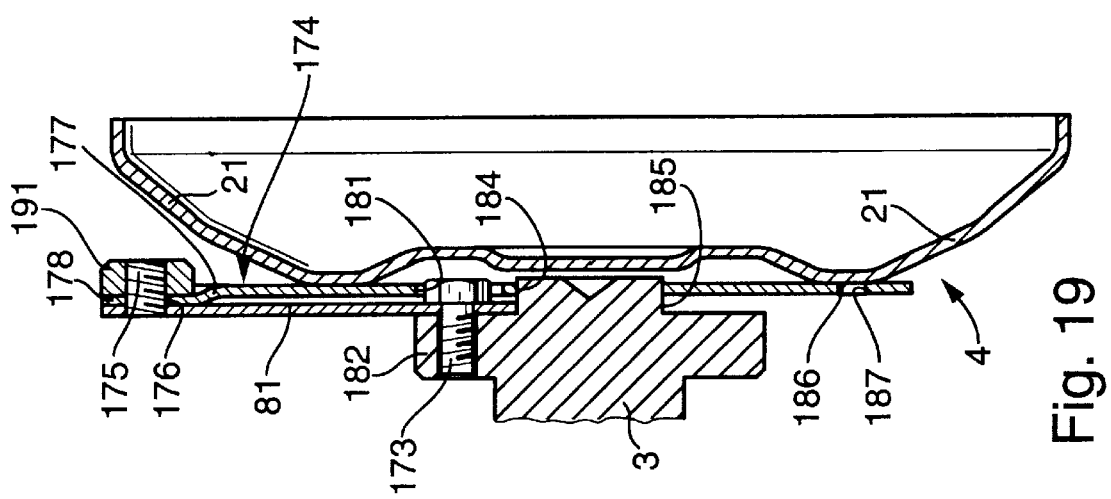
FIG. 19 is a fragmentary sectional view similar to that of FIG. 17 but showing modified means for centering the housing of the torque converter on the output element of a prime mover.

FIGS. 19 and 20 show a modification of the centering means for the annular member 174. The central portion 179 (FIGS. 17, 18) is omitted and a central opening 184 of the member 174 is centered externally on a cylindrical portion 185 of the output member 3, the same as the torque transmitting member 81.

FIG. 20 shows that the member 174 can be welded to the driving section 4 at several arcuate locations 186. The welding can involve a so-called MAG operation (thermod metal active gas welding) and takes place along elongated arcuate slots 187 of the member 174. The centers of curvature of the slots 187 and welded locations 186 are preferably disposed on the common axis of the output member 3 and the properly centered driving section 4. Furthermore, the slots 187 and the welded locations 186 are preferably equidistant from each other as seen in the circumferential direction of the driving section 4 and its conical portion 21.

Referring to FIG. 21, there is shown a third centering arrangement for the driving section 4, and more specifically an arrangement for centering the driving section 4 on the hub 11. The manner of centering the section 4 on the output member 3 of a prime mover is or can be the same as shown in FIG. 17. The driving section 4 includes a centrally located hollow centering projection 189 extending into a centering recess in the adjacent end face of the hub 11. Such centering recess is surrounded by a cylindrical internal centering surface 190 of the hub 11. An optional bearing sleeve 188 is interposed between the peripheral surface of the projection 189 and the internal surface 190.

FIG. 22 shows that the nuts 191 of FIGS. 17 and 19 (on the shanks of the fasteners 175) can be omitted if the member 174 is made of one piece with nuts 191' which can receive the shanks of the fasteners 175.

It is to be noted that the various novel features which are described in this specification and are shown in FIGS. 1 to 22 can be used in any proper combination with as well as independently of each other. For example, the feature(s) shown in any one of the FIGS. 2–22 can be utilized independently of the novel features of the torque converter 1 of FIG. 1, the features of FIG. 10 or 11 can be used independently of any and all (or some) other features, and so on.

The disclosures of all of the following U.S. patents are incorporated herein by reference: U.S. Pat. Nos. 5,295,915, 5,667,448 and 5,711,730. The disclosure of the commonly owned U.S. patent application Ser. No. 08/649,065 (filed May 16, 1996 by Dieter Otto et al.) is also incorporated herein by reference.

The disclosure of the U.S. Pat. No. 5,711,730 is of particular interest in connection with the utilization of a torque sensor having plural plenum chambers in conjunction with a continuously variable transmission (CVT).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our above outlined contribution to the art of hydrokinetic torque converters and, therefore, such adaptations should and are intended to be comprehended within the meaning and range of equivalence of the appended claims.

What is claimed is:

1. A hydrokinetic torque converter comprising a housing rotatable about a predetermined axis and including a driving section; a rotary pump, a rotary turbine, and a stator disposed in said housing; an engageable and disengageable lockup clutch provided in said housing and spacedly surrounding said axis; and a hydromechanical torque sensor disposed in said housing between said turbine and said section, as seen in the direction of said axis, and radially inwardly of said clutch, said torque sensor comprising a cylinder and plunger unit and having plenum chambers provided with inlets/outlets for a hydraulic fluid.

2. The torque converter of claim 1, further comprising a rotary input member non-rotatably connected with said driving section and forming part of a prime mover.

3. The torque converter of claim 1, further comprising a rotary output element including a shaft arranged to drive a transmission and a hub non-rotatably surrounding said shaft and arranged to receive torque from one of said turbine and said lockup clutch.

4. The torque converter of claim 3, wherein said transmission is a continuously variable transmission.

5. The torque converter of claim 1, wherein said lockup clutch comprises a piston axially movably and non-rotatably surrounding a rotary output element having an axis coinciding with said predetermined axis, a friction surface of said driving section of said housing being in frictional engagement with said piston in the engaged condition of said clutch and being rotatable relative to said piston in the disengaged condition of said clutch, and further comprising means for rotating said driving section including a prime mover having a rotary output member and a flexible torque transmitting member interposed between and connected with said output member and said driving section of said housing.

6. The torque converter of claim 5, wherein said output member comprises a crankshaft and said prime mover includes a combustion engine.

7. The torque converter of claim 1, wherein said housing further comprises a second section driven by said driving section and arranged to rotate said pump and rotatably surrounding a rotary output element of the torque converter, said lockup clutch comprising a piston rotatable with said turbine and including a conical radially outer portion, said clutch further comprising a second conical portion provided on said driving section and confronting said radially outer portion of said piston, and at least one friction lining between said conical portions, said piston being movable in the direction of said predetermined axis toward and away from said driving section to respectively engage and disengage said clutch, said torque sensor comprising neighboring first and second profiled annular members and spreading elements between sad profiled members, said first profiled member being arranged to rotate with said output element and said second profiled member being arranged to rotate with said piston about said predetermined axis and to move relative to said piston in the direction of said axis.

8. A hydrokinetic torque converter comprising a housing rotatable about a predetermined axis and including a driving section and a second section driven by said driving section; a rotary pump arranged to be rotated by said second section and to rotatably surround a rotary output element of the torque converter; a rotary turbine; a stator, said pump and said turbine and said stator being disposed in said housing; an engageable and disengageable lockup clutch provided in said housing and spacedly surrounding said axis, said clutch comprising a piston rotatable with said turbine and including a conical radially outer portion and a radially inner portion including a tubular flange extending in the direction of said predetermined axis toward said driving section of said housing, said clutch further comprising a second conical portion provided on said driving section and confronting said radially outer portion of said piston, and at least one friction lining between said conical portions, said piston being movable in the direction of said predetermined axis toward and away from said driving section to respectively engage and disengage said clutch; a torque sensor disposed in said housing between said turbine and said driving section, as seen in the direction of said axis, and radially inwardly of said clutch, said torque sensor comprising neighboring first and second profiled annular members and spreading elements between said profiled members, said first profiled member being arranged to rotate with said output element and said second profiled member being arranged to rotate with said piston about said predetermined axis and to move relative to said piston in the direction of said axis; a first annular member non-rotatably connected with said radially inner portion of said piston and having a tubular radially inner portion provided with internal teeth; a second annular member having external teeth mating with said internal teeth and including a radially inner portion rotatable relative to said output element about said predetermined axis and movable relative to said output element in the direction of said predetermined axis; a third annular member including a radially outer first tubular portion rotatable relative to said tubular flange of said piston about said predetermined axis and movable relative to said flange in the direction of said predetermined axis, said third annular member further including a radially inner second tubular portion non-rotatably mounted on said second annular member, said second profiled annular member of said torque sensor having a radially outer portion provided with external teeth mating with internal teeth provided on a second tubular portion of said third annular member; and an annular plunger non-rotatably provided on a radially inner portion of said second profiled annular member and including a tubular first portion extending in the direction of said predetermined axis toward said second section of said housing; a second portion extending from said tubular first portion outwardly toward said clutch, and a tubular third portion extending from said second portion of said plunger toward said driving section of said housing and sealingly engaging said tubular first portion of said third annular member, said third portion of said plunger being rotatable relative to said tubular first portion of said third annular member about said predetermined axis and being movable relative to said tubular first portion of said third annular member in the direction of said predetermined axis.

9. The torque converter of claim 8, wherein said second portion of said plunger extends at least substantially radially of said predetermined axis.

10. The torque converter of claim 8, wherein said output element comprises a hub and a shaft non-rotatably surrounded by said hub, said first profiled annular member of said torque sensor being non-rotatably secured to said hub, said second profiled annular member of said torque sensor being rotatable on said hub about said predetermined axis and being movable relative to said hub in the direction of said predetermined axis, said tubular first portion of said plunger being in sealing engagement with an annular external collar of said hub and being rotatable about said collar and about said predetermined axis and being movable relative to said collar in the direction of said predetermined axis, said radially inner portion of said second annular member being rotatable on said hub about said predetermined axis and being movable relative to said hub in the direction of said predetermined axis, said plunger and said collar and said hub and said second and third annular members jointly defining a fluid-containing plenum chamber and said hub having at least one channel in communication with said plenum chamber.

11. The torque converter of claim 10, wherein said second profiled annular member of said torque sensor and said plunger and said collar and said hub jointly define a second fluid-containing plenum chamber, said output element defining a second channel communicating with said second plenum chamber.

12. The torque converter according to claim 10, wherein said third annular member further includes a portion extending substantially radially of said predetermined axis and including a tubular part sealingly engaging said hub, said tubular part being rotatable relative to said hub about said predetermined axis and being movable relative to said hub in the direction of said predetermined axis.

13. The torque converter of claim 8, wherein said output element comprises a hub and a shaft non-rotatably surrounded by said hub, said first profiled annular member of said torque sensor being non-rotatably secured to said hub, said second profiled annular member of said torque sensor being rotatable on said hub about said predetermined axis and being movable relative to said hub in the direction of said predetermined axis, said tubular first portion of said plunger being in sealing engagement with an annular external collar of said hub and being rotatable about said collar and about said predetermined axis and being movable relative to said collar in the direction of said predetermined axis, said radially inner portion of said second annular member being rotatable on said hub about said predetermined axis and being movable relative to said hub in the direction of said predetermined axis, said second profiled annular member of said torque sensor and said plunger and said collar and said hub jointly defining a fluid-containing plenum chamber and said output element defining a channel communicating with said plenum chamber.

14. The torque converter of claim 8, wherein at least one of (a) said piston, (b) at least one of said first, second and third annular members, (c) said plunger, and (d) at least one section of said housing is obtained by deep drawing.

* * * * *